United States Patent
Yata et al.

(10) Patent No.: US 11,475,769 B2
(45) Date of Patent: Oct. 18, 2022

(54) PARKING ASSISTANCE APPARATUS AND PARKING ASSISTANCE METHOD

(71) Applicant: Mitsubishi Electric Corporation, Tokyo (JP)

(72) Inventors: Masahiro Yata, Tokyo (JP); Nariaki Takehara, Tokyo (JP); Kenta Onishi, Tokyo (JP); Kunio Ueda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/056,470

(22) PCT Filed: Jul. 9, 2018

(86) PCT No.: PCT/JP2018/025830
§ 371 (c)(1),
(2) Date: Nov. 18, 2020

(87) PCT Pub. No.: WO2020/012519
PCT Pub. Date: Jan. 16, 2020

(65) Prior Publication Data
US 2021/0118299 A1   Apr. 22, 2021

(51) Int. Cl.
*G08G 1/14* (2006.01)
*B62D 6/00* (2006.01)

(52) U.S. Cl.
CPC .................................. *G08G 1/141* (2013.01)

(58) Field of Classification Search
CPC .......... G08G 1/14; G08G 1/141; B62D 15/02; B60K 99/00; B60W 30/06
See application file for complete search history.

(56) References Cited

U.S. PATENT DOCUMENTS

| 10,604,185 B2 * | 3/2020 | Benmimoun ........ G05D 1/0212 |
| 2012/0062394 A1 | 3/2012 | Pampus et al. |

(Continued)

FOREIGN PATENT DOCUMENTS

| CN | 108136987 A | 6/2018 |
| JP | 2009-192365 A | 8/2009 |

(Continued)

OTHER PUBLICATIONS

International Search Report for PCT/JP2018/025830 dated Sep. 4, 2018 [PCT/ISA/210].

(Continued)

*Primary Examiner* — Tan Q Nguyen
(74) *Attorney, Agent, or Firm* — Sughrue Mion, PLLC; Richard C. Turner

(57) ABSTRACT

A parking assistance apparatus includes: a parking space searching unit for searching for a parking-allowable parking space in which a user's vehicle can be parked; a target parking space selection unit for selecting a target parking space in which the user's vehicle is to be parked, based on an user setting information, when a plurality of parking-allowable parking spaces are detected; a parking operation assisting unit for assisting in a parking operation for parking the user's vehicle in the target parking space; and a parking operation assistance start determination unit for determining whether or not a determination condition for starting a parking operation is satisfied according to a state of the user's vehicle, and causing the parking operation assisting unit to start assisting in the parking operation when the determination condition is satisfied.

25 Claims, 17 Drawing Sheets

(56) References Cited

U.S. PATENT DOCUMENTS

| | | | | |
|---|---|---|---|---|
| 2016/0061618 | A1* | 3/2016 | Benenson | G01C 21/3453 |
| | | | | 701/428 |
| 2018/0093663 | A1* | 4/2018 | Kim | G08G 1/166 |
| 2018/0186407 | A1* | 7/2018 | Kim | B60W 30/06 |
| 2018/0286240 | A1* | 10/2018 | Harai | B62D 6/00 |
| 2018/0308359 | A1 | 10/2018 | Hayakawa | |
| 2018/0315312 | A1* | 11/2018 | Hayakawa | G08G 1/143 |
| 2018/0322349 | A1 | 11/2018 | Hayakawa | |
| 2020/0226926 | A1* | 7/2020 | Suzuki | B60W 30/06 |
| 2020/0369262 | A1* | 11/2020 | Suzuki | G06V 20/588 |
| 2020/0406889 | A1* | 12/2020 | Yamanaka | G05D 1/0011 |

FOREIGN PATENT DOCUMENTS

| | | |
|---|---|---|
| JP | 2009-205191 A | 9/2009 |
| JP | 2009-294094 A | 12/2009 |
| JP | 2010-117864 A | 5/2010 |
| JP | 2011-042356 A | 3/2011 |
| JP | 2013-126868 A | 6/2013 |
| JP | 2016-215691 A | 12/2016 |
| WO | 2017/068695 A1 | 4/2017 |

OTHER PUBLICATIONS

Notice of Reasons for Refusal dated Dec. 7, 2021 from the Japanese Patent Office in Japanese Application No. 2020-529846.
Office Action dated Aug. 10, 2022 from the China National Intellectual Property Office in CN Application No. 201880095367.2.

* cited by examiner

PARKING ASSISTANCE APPARATUS AND PARKING ASSISTANCE METHOD

CROSS REFERENCE TO RELATED APPLICATIONS

This application is a National Stage of International Application No. PCT/JP2018/025830 filed Jul. 9, 2018.

TECHNICAL FIELD

The invention according to the present disclosure relates to a parking assistance apparatus and a parking assistance method.

BACKGROUND ART

A conventional parking assistance apparatus detects a parking-allowable space based on a result of detection for an obstacle that hinders the parking, and determines whether or not a parking space for a vehicle is available in the detected parking-allowable space, to set a frame line disposition candidate in the parking-allowable space, when a user's vehicle is parked (for example, see Patent Document 1). Such a parking assistance apparatus combines an image representing the set frame line disposition candidate with a taken image or a virtual viewpoint image, and displays a composite image thereof to assist a user in a parking operation.

CITATION LIST

Patent Document

Patent Document 1: Japanese Laid-Open Patent Publication No. 2016-215691

SUMMARY OF THE INVENTION

Problems to be Solved by the Invention

However, in the above-described configuration, a user needs to explicitly indicate the start of the parking assistance by, for example, selecting a frame line disposition candidate in which the user's vehicle is to be parked. Therefore, in a case where the user intends to park the user's vehicle in a desired parking space, the user needs to always stop the user's vehicle and then provide a parking assistance start instruction. Thus, a procedure for starting the parking assistance may be complicated.

The invention according to the present disclosure has been made in order to solve the aforementioned problem, and an object of the present disclosure is to provide a parking assistance apparatus and a parking assistance method that prevent reduction of convenience for a user and allow the user to smoothly park the user's vehicle in a desired parking space.

Solution to the Problems

A parking assistance apparatus according to the invention of the present disclosure includes: a user setting unit for allowing a user to set information on parking of a user's vehicle; a target parking space searching•selecting unit for searching for a space in which the user's vehicle can be parked, and selecting a target parking space in which the user's vehicle is to be parked, based on the information in the user setting unit; a parking operation assisting unit for assisting in a parking operation for parking the user's vehicle in the selected target parking space, based on a start determination result from a parking operation assistance start determination unit described below; and a parking operation assistance start determination unit for causing the parking operation assisting unit to start assisting in a parking operation in a case where the start determination result indicates that assistance in the parking operation can be started by the parking operation assisting unit.

Furthermore, a parking assistance method according to the invention of the present disclosure includes: a user setting step of allowing a user to set information on parking of a user's vehicle; a target parking space searching•selecting step of searching for a space in which the user's vehicle can be parked and selecting a target parking space in which the user's vehicle is to be parked, based on the information having been set by the user; a parking operation assisting step of assisting in a parking operation for parking the user's vehicle in the selected target parking space, based on a start determination result in a parking operation assistance start determination step described below; and a parking operation assistance start determination step of starting assisting in a parking operation in the parking operation assisting step in a case where the start determination result indicates that assistance in the parking operation in the parking operation assisting step can be started.

Effect of the Invention

The invention according to the present disclosure can prevent reduction of convenience for a user and allow a user's vehicle to be smoothly parked in a desired parking space.

DESCRIPTION OF EMBODIMENTS

Embodiment 1

Figure 1:
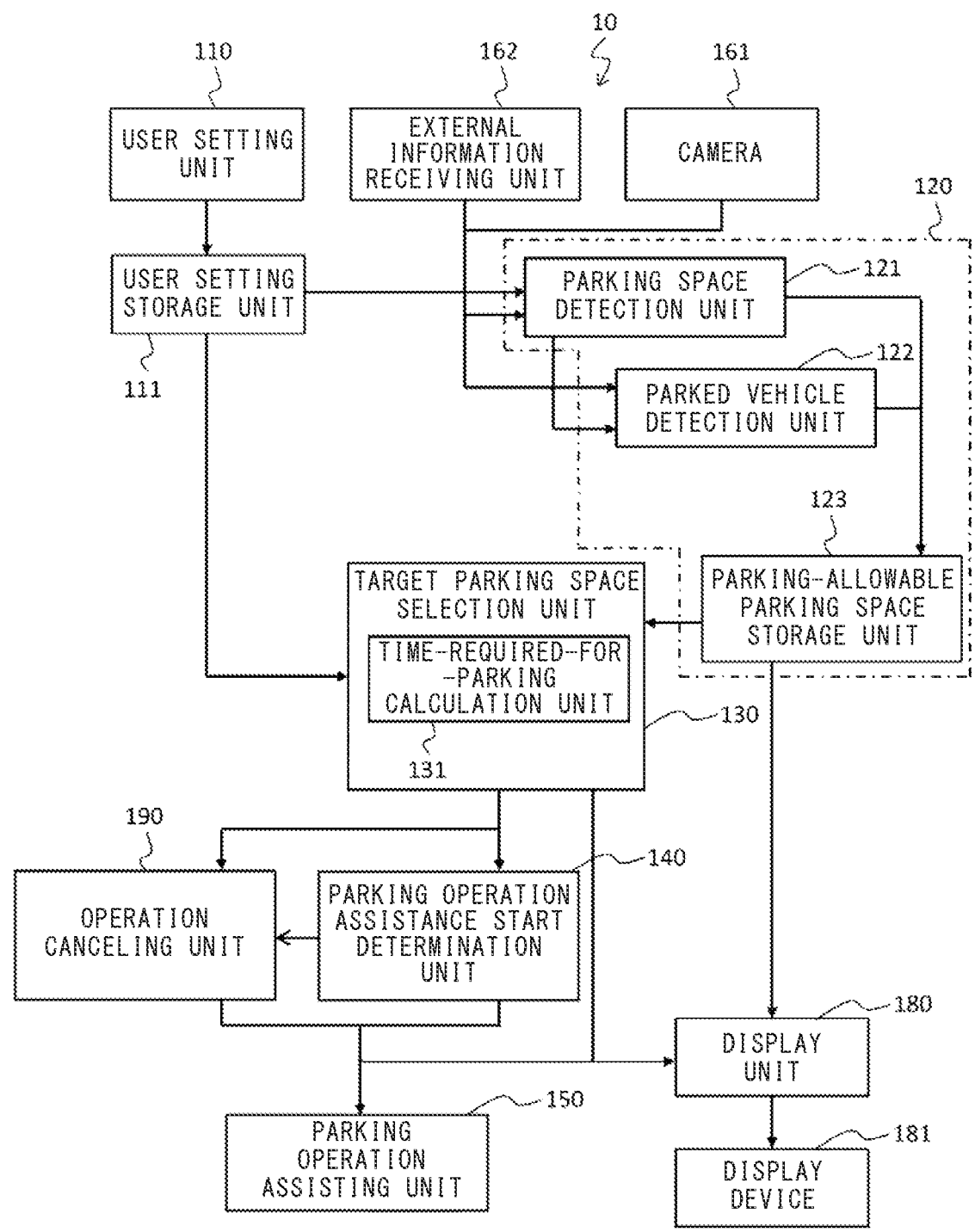
FIG. 1 is a block diagram illustrating a configuration of a parking assistance apparatus according to embodiment 1.

Embodiment 1 will be described below with reference to FIG. 1 to FIG. 7. FIG. 1 is a block diagram illustrating a configuration of a parking assistance apparatus according to embodiment 1. A parking assistance apparatus 10 is mounted to a user's vehicle (not shown) for which parking assistance is to be performed. Reference character 110 denotes a user setting unit for receiving input of user setting information. Reference character 120 denotes a parking space searching unit for searching for a parking-allowable parking space around the user's vehicle. Reference character 130 denotes a target parking space selection unit for selecting a target parking space from the parking-allowable parking space that is detected by the parking space searching unit 120, according to a selection condition designated by a user. Reference character 140 denotes a parking operation assistance start determination unit for determining whether or not a vehicle is in a state where the vehicle can be assisted in a parking operation. Reference character 150 denotes a parking operation assisting unit for assisting a user in a parking operation based on the determination result by the parking operation assistance start determination unit 140. Reference character 180 denotes a display unit for causing a display device 181 such as an LCD (liquid crystal display) to display various information. Reference character 190 denotes an operation canceling unit for canceling a parking assistance operation being executed, and starting a parking assistance operation from the beginning in a case where a predetermined condition is satisfied. In the description here, the "parking-allowable parking space" represents a parking space in which the user's vehicle can be parked. The "target parking space" represents a target in which the user's vehicle is to be parked.

The user setting unit 110 receives input (reception) of user setting information from a user, and thereafter causes a user setting storage unit 111 to store the user setting information. The user setting information includes, for example, conditions, for a parking space, such as the user's vehicle size information and user preference information. As described below, a selection condition for selecting a target parking space is set based on the user preference information. That is, a user inputs information on the user's preference for parking, in the user setting unit 110, whereby a selection criterion for selecting the target parking space is set. In embodiment 1, the user preference information indicating that "I would like to park my vehicle in a parking space for which a time until completion of parking is shortest, when assistance in parking is provided", is inputted. Therefore, the selection condition for selecting the target parking space is "the time required for parking is shortest".

The parking space searching unit 120 includes units denoted by reference characters 121 to 123 described below. Reference character 121 denotes a parking space detection unit for detecting a parking space around the user's vehicle. Reference character 122 denotes a parked vehicle detection unit for detecting another vehicle parked in the parking space detected by the parking space detection unit 121. Reference character 123 denotes a parking-allowable parking space storage unit for storing information on a parking space in which another parked vehicle has not been detected by the parked vehicle detection unit 122, that is, information on a parking-allowable parking space that is a parking space in which the user's vehicle can be parked, in the parking spaces detected by the parking space detection unit 121.

The parking space detection unit 121 obtains a periphery image taken by a camera 161 for taking an image of a periphery of the user's vehicle, and obtains, for example, map information of the periphery of the user's vehicle and position information of the user's vehicle, from an external information receiving unit 162, and performs searching and detection of a parking space around the user's vehicle by using the information. The parking space detection unit 121 detects that the user's vehicle has entered a parking lot or is near the parking lot, based on the position information obtained from the external information receiving unit 162 and the periphery image obtained from the camera 161, and searches for a parking space around the user's vehicle. The parking space detection unit 121 identifies a car stop and a line on a road surface based on the map information and the periphery image, and compares the size and the shape of the frame line surrounded by the identified line, with the size information on the user's vehicle which is stored in the user setting storage unit 111, and detects a parking space that meets the size requirements of the user's vehicle. In a case where the map information obtained from the external information receiving unit 162 includes the position information of the peripheral parking space, the parking space may be detected by using the map information obtained from the external information receiving unit 162. A range in which the parking space is searched for may be set through the user setting unit 110. The parking space detection unit 121 obtains information (hereinafter, detected parking space information) related to the position, the width, the depth, and the shape of the detected parking space in order to detect a parking space around the user's vehicle.

The camera 161 is disposed around the user's vehicle, for example, on the front side, the lateral sides, and the rear side of the user's vehicle, and takes an image of the periphery of the user's vehicle. As the camera 161, for example, a CCD (charge-coupled device) camera or a CMOS (complementary metal-oxide semiconductor) camera may be used. The external information receiving unit 162 receives information from, for example, a GPS (global positioning system) unit, and receives the map information on the periphery of the user's vehicle through the GPS unit from an artificial satellite.

The parked vehicle detection unit 122 obtains the detected parking space information from the parking space detection unit 121, and obtains information on the periphery of the user's vehicle from the camera 161 and the external information receiving unit 162, and compares the periphery information with the detected parking space information to detect a parked vehicle that is parked in the detected parking space. Another vehicle has already been parked in the detected parking space in which the parked vehicle has been detected by the parked vehicle detection unit 122, and the user's vehicle cannot be parked. Meanwhile, another vehicle is not parked in the detected parking space in which no parked vehicle has been detected by the parked vehicle detection unit 122, and the user's vehicle can be parked.

The parking-allowable parking space storage unit 123 obtains the detected parking space information from the parking space detection unit 121, and stores only a space in which the user's vehicle can be parked, among the detected parking spaces, as the parking-allowable parking space, with reference to the result of detection of the parked vehicle by the parked vehicle detection unit 122.

The target parking space selection unit 130 obtains information on the parking-allowable parking space from the parking-allowable parking space storage unit 123, and obtains the user preference information from the user setting storage unit 111, and sets the condition representing "the time required for parking is shortest", as the selection condition, according to the obtained preference information, and selects the target parking space according to this selection condition.

The target parking space selection unit 130 includes a time-required-for-parking calculation unit 131 for calculating a time required for parking the user's vehicle in the parking-allowable parking space. The time-required-for-parking calculation unit 131 calculates a time required for parking for each of one or more parking-allowable parking spaces stored in the parking-allowable parking space storage unit 123. The time required for parking can be calculated by dividing a length of a predicted route to be taken until the vehicle is parked in the subject parking-allowable parking space, by a predicted speed of the user's vehicle which is performing the parking operation. The predicted route may be set based on the current position and orientation of the user's vehicle and the position and orientation of the subject parking-allowable parking space. The predicted speed may be designated by a user through the user setting unit 110 or the predicted speed may be determined based on the average speed in the previous parking operations. The target parking space selection unit 130 sets the parking-allowable parking space for which the time required for parking is shortest, as the target parking space, according to the selection condition for selecting the target parking space.

The target parking space selection unit 130 that has selected the target parking space notifies the parking operation assistance start determination unit 140 and the display unit 180 that the selection of the target parking space has been completed. Furthermore, the target parking space selection unit 130 transmits information on the position, the orientation, the shape, the size, and the like of the target parking space to the parking operation assisting unit 150 and the display unit 180. In a case where the target parking space cannot be selected since, for example, no parking-allowable parking space is available, the operation canceling unit 190 and the display unit 180 are notified that the target parking space cannot be selected.

The parking operation assistance start determination unit 140 receives the notification that the target parking space has been selected, from the target parking space selection unit 130, and thereafter determines whether or not a determination condition for starting the parking operation has been satisfied, according to a state of the user's vehicle. In a case where the determination condition is satisfied, the parking operation assisting unit 150 is caused to start the parking operation assistance. In embodiment 1, "whether or not the user's vehicle is in a parking start orientation" is determined as the determination condition for causing the parking operation assisting unit 150 to start the parking operation assistance. In the description herein, the "parking start orientation" represents, for example, a "state in which the user's vehicle has stopped and a shift is at a reverse position". In a case where the user's vehicle is in the parking start orientation, this state is determined to indicate that "the user would like to be assisted in parking so as to park the user's vehicle in the target parking space", and an instruction for starting the parking operation assistance is transmitted to the parking operation assisting unit 150 and the notification of start of the parking operation assistance is transmitted to the display unit 180. The parking operation assisting unit 150 that has received the instruction for starting the parking operation assistance starts the parking operation assistance. The display unit 180 that has received the notification for the parking operation assistance causes the display device 181 to indicate, through display, that the parking operation assistance has started. That is, the parking operation assistance start determination unit determines (start determination) whether or not the parking operation assisting unit can start assistance in parking operation, based on the running state of the user's vehicle or the shift state of the user's vehicle. For example, the parking operation assistance start determination unit determines (determination of start) that the parking operation assisting unit can start assistance in parking operation when the shift is at a reverse position in the user's vehicle. The parking operation assistance start determination unit causes the parking operation assisting unit to start the assistance in parking operation in a case where the parking operation assisting unit can start the assistance in parking operation (in the case of the determination of start).

In a case where the user's vehicle has not stopped, or the shift is not at a reverse position although the user's vehicle has stopped, this state is determined to indicate that "the user does not intend to park the user's vehicle in the target parking space", and the instruction for canceling the operation is transmitted to the operation canceling unit 190 and the notification of canceling of the operation is transmitted to the display unit 180. In a case where the target parking space is manually designated, this state is determined to indicate "the user would like to be assisted in a parking operation for parking in the parking space that is manually designated by the user", and the parking space that is manually designated by the user is set as the target parking space even if the time required for parking in the parking space that is manually designated by the user is not shortest, and instruction for starting the parking operation assistance is transmitted to the parking operation assisting unit 150 and the notification of start of the parking operation assistance may be transmitted to the display unit 180. In this case, the parking operation assisting unit 150 that has received the instruction for starting the parking operation assistance starts the parking operation assistance. The display unit 180 that has received the notification for the parking operation assistance causes the display device 181 to indicate, through display, that parking operation assistance has started for parking in the parking space that has been manually designated by the user.

The parking operation assisting unit 150 that has received the instruction for starting the parking operation assistance, from the parking operation assistance start determination unit 140, performs parking operation assistance so as to park the user's vehicle in the target parking space. Specifically, the parking operation assisting unit 150 assists the user in the parking operation by a steering operation such that the user's vehicle moves along a route from the current position to the parking position. The parking operation assisting unit 150 may perform an accelerator-brake operation in addition to the steering operation. In this case, the user need not perform a manual operation at all during the parking operation. A degree of the parking assistance to be performed may be preset through the user setting unit 110.

Figure 2:
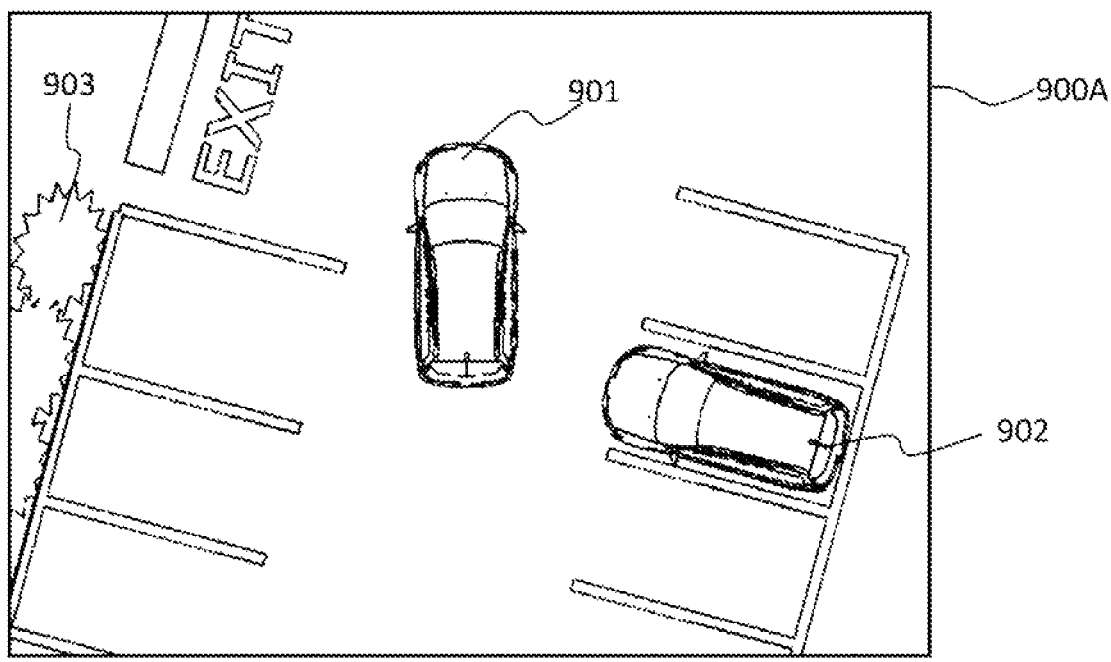
FIG. 2 illustrates an example of a display screen of the parking assistance apparatus according to the present disclosure and illustrates the display screen displayed at the start of parking assistance.
Figure 3:
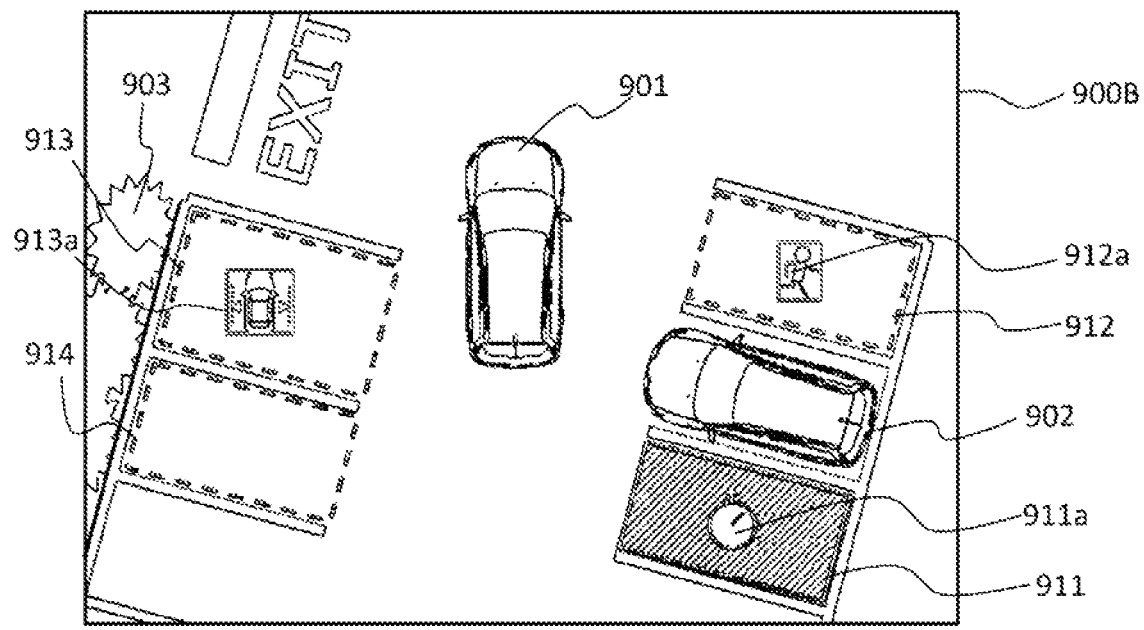
FIG. 3 illustrates an example of a display screen of the parking assistance apparatus according to the present disclosure and illustrates the display screen displayed when a target parking space is selected.
Figure 4:
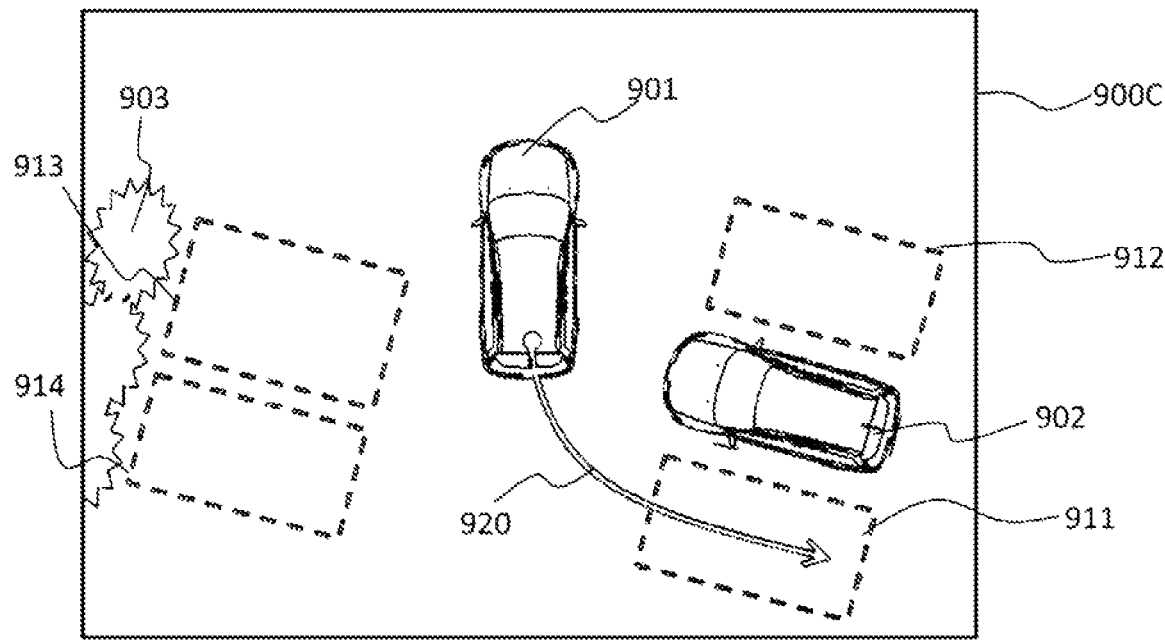
FIG. 4 illustrates an example of a display screen of the parking assistance apparatus according to the present disclosure, and illustrates the display screen displayed at the start of parking operation assistance.

The display unit 180 causes the display device 181 to display a state of the parking assistance performed by the parking assistance apparatus 10, and obtains a periphery image from the camera 161, obtains the information on the parking-allowable parking space from the parking-allowable parking space storage unit 123, and causes the display device 181 to display an image or a video image obtained by combining the periphery image and the information on the parking-allowable parking space. FIG. 2 illustrates a display screen displayed when the parking assistance starts. FIG. 3 illustrates a display screen displayed when the target parking space is detected and selected. FIG. 4 illustrates a display screen displayed when the parking operation assistance starts. The display screens shown in FIG. 2 to FIG. 4 are examples, and the display screens are not limited to these display screens.

On a display screen 900A, a bird's eye view video image indicating that a user's vehicle 901 is running at a low speed in the parking lot, is displayed. Such a bird's eye view video image can be obtained from the camera 161. Furthermore, on the display screen 900A, another vehicle 902 that is parked, and an obstacle 903 around parking spaces are displayed.

On a display screen 900B, a plurality of parking-allowable parking spaces 911 to 914 having been detected are displayed. The parking-allowable parking spaces 911 to 913 are indicated with marks 911a to 913a, respectively, for representing the characteristics of the parking-allowable spaces. The mark 911a represents a parking-allowable parking space for which the time required for parking is shortest. The mark 912a represents a parking-allowable parking space for which the time required for exiting the parking lot is shortest. The mark 913a represents a space in which the parking margin spaces on both sides of the user's vehicle that has been parked are largest. The display unit 180 displays the parking-allowable parking space selected as the target parking space in a highlighted manner on the display screen 900B in order to indicate, to the user, the parking-allowable parking space selected as the target parking space from among the parking-allowable parking spaces 911 to 914. The display screen 900B represents an example of a display for a case where the parking-allowable parking space 911 is selected as the parking-allowable parking space for which the time required for parking is shortest, and, thus, shading is displayed on the parking-allowable parking space 911. The highlighting method is not particularly limited, and the target parking space may blink. Furthermore, the parking-allowable parking space which has not been selected as the target parking space may be deleted from the screen, thereby displaying the target parking space. The display screen 900B allows the user to easily confirm, for example, the position and the orientation of the target parking space and the state of the periphery.

On a display screen 900C, a predicted parking route 920 taken when the user's vehicle 901 is parked in the parking-allowable parking space 911 selected as the target parking space, is displayed. When the parking operation assistance by the parking operation assisting unit 150 starts, movement of the user's vehicle 901 along the predicted parking route 920 until parking of the user's vehicle in the parking-allowable parking space 911, is displayed. The display screen 900C allows the user to easily confirm the state of the user's vehicle 901 that is performing the parking operation.

Figure 5:
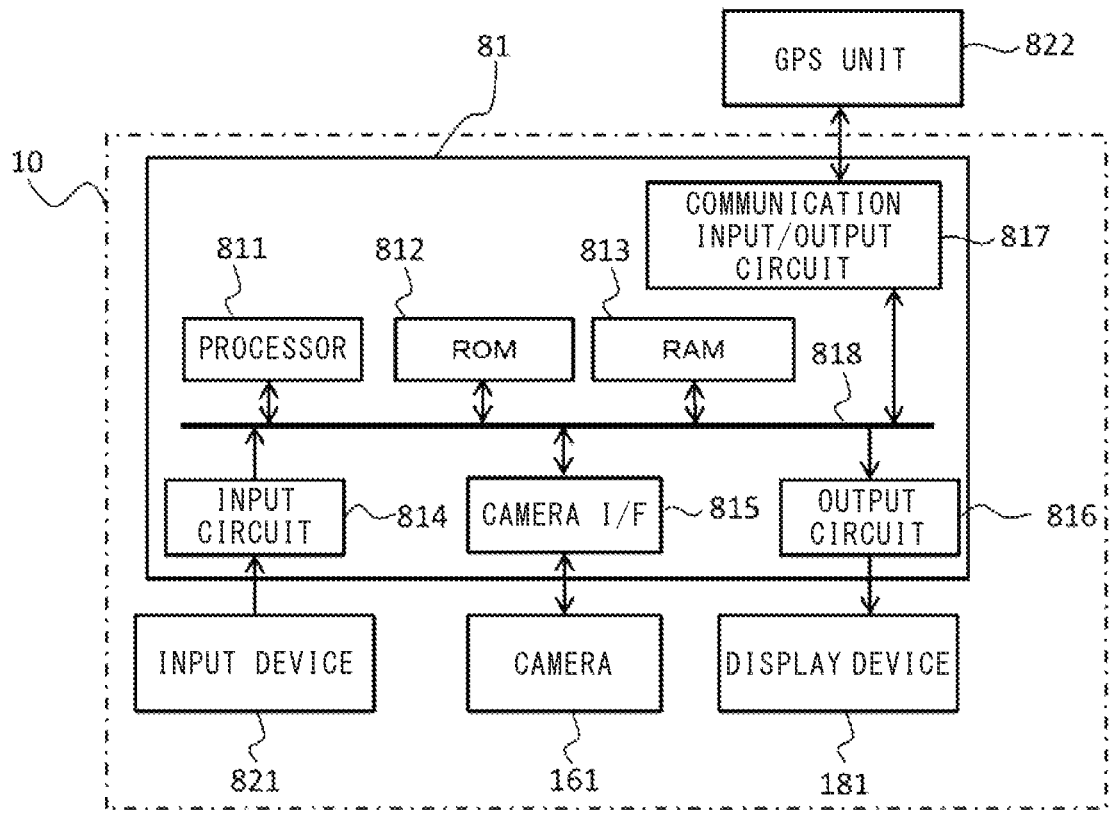
FIG. 5 illustrates a hardware configuration of the parking assistance apparatus according to embodiment 1.

Next, a hardware configuration for implementing the function portions shown in FIG. 1 will be described. FIG. 5 illustrates a hardware configuration of the parking assistance apparatus according to embodiment 1. The parking assistance apparatus 10 is structured such that the camera 161 and the display device 181 are connected to a main unit 81. In the main unit 81, a processor 811 for executing a program for implementing each function portion, a ROM (read only memory) 812 and a RAM (random access memory) 813 for storing the program executed by the processor 811 and various data, an input circuit 814 for receiving input from an input device 821, a camera interface (I/F) 815 for performing input and output processes between the main unit 81 and the camera 161, an output circuit 816 for outputting a display screen to the display device 181 such as, for example, a liquid crystal panel, and a communication input/output circuit 817 for performing data transmission and reception with an external GPS unit 822 are connected to each other via a system bus 818. Each of the function portions of the parking assistance apparatus 10 is implemented by the processor 811 executing the program stored in a memory such as the ROM 812 and the RAM 813. The function portions may be implemented by a plurality of the processors 811 and a plurality of the ROMs 812 and RAMs 813 operating in conjunction with each other. As the input device 821, for example, a touch panel or a keyboard may be used, or a sound input device such as a microphone may be used.

Figure 6:
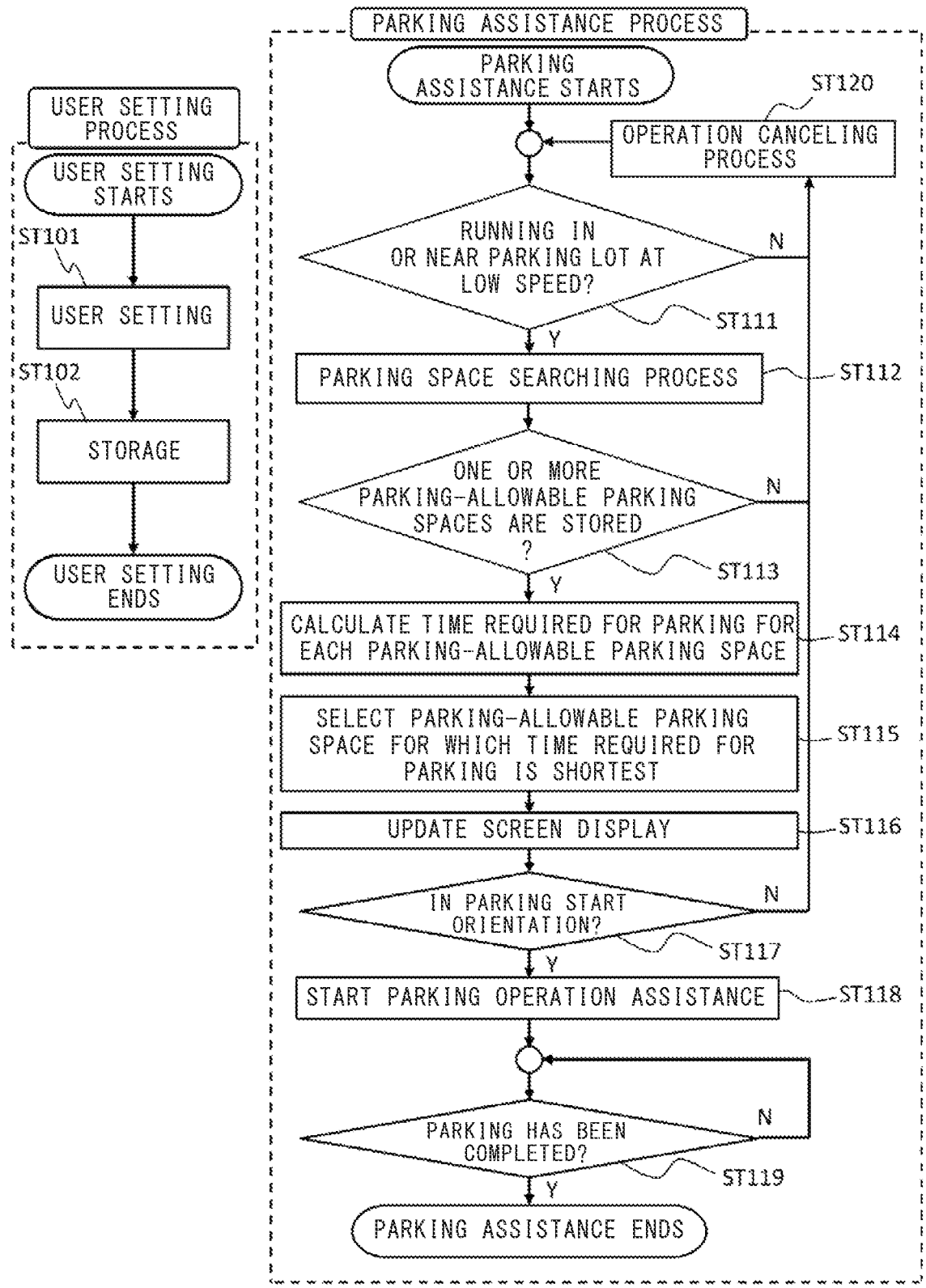
FIG. 6 is a flow chart showing a parking assistance method according to embodiment 1.
Figure 7:
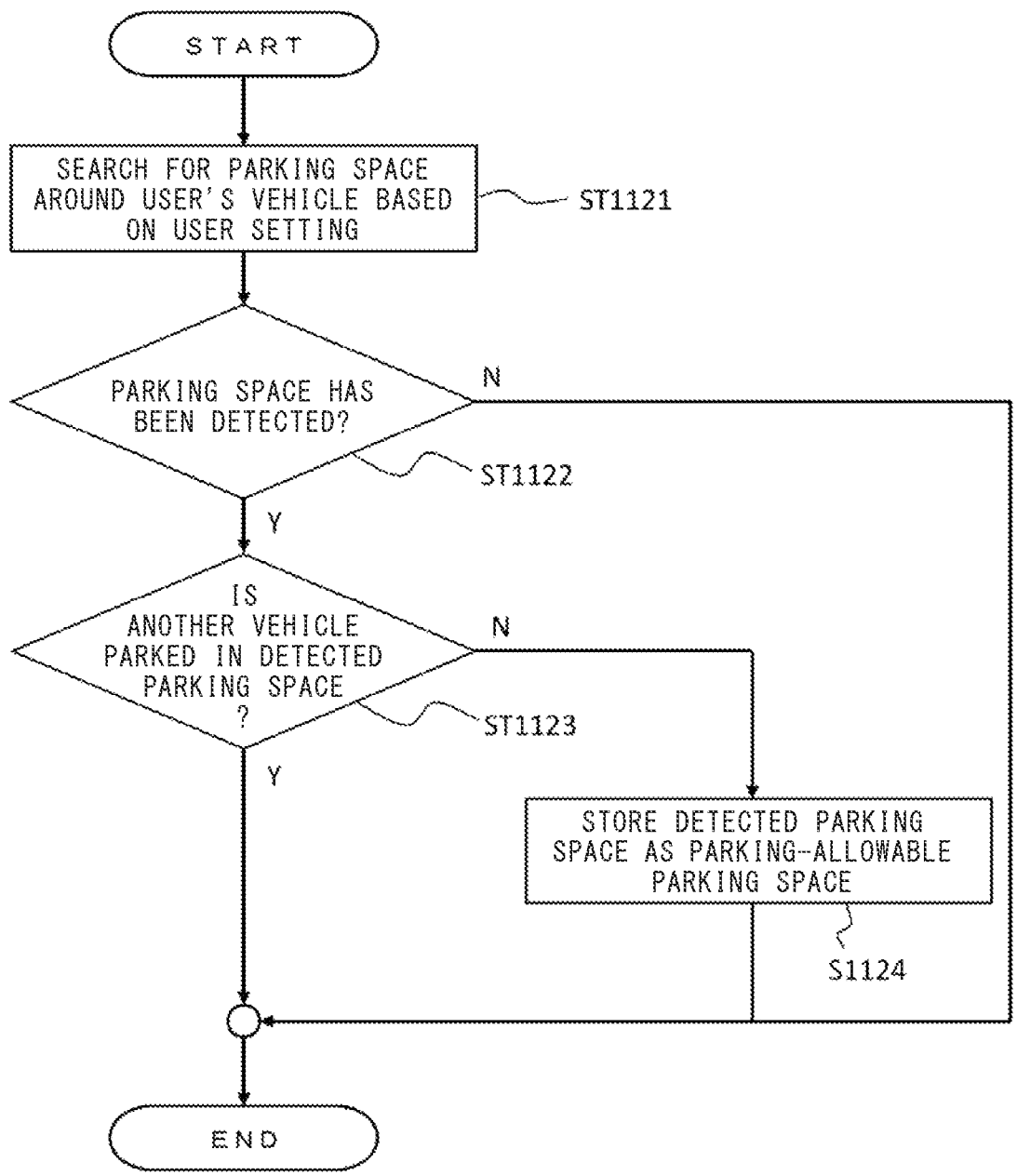
FIG. 7 is a flow chart showing a parking space searching process according to embodiment 1.

Next, an operation will be described. FIG. 6 is a flow chart showing a parking assistance method according to embodiment 1. FIG. 7 is a flow chart showing a parking space searching process according to embodiment 1. The parking assistance method according to embodiment 1 includes a "user setting process" and a "parking assistance process". The parking assistance process includes a "parking space searching process", a "target parking space selection process", a "parking operation assistance start determination process", and a "parking operation assisting process". Firstly, in the user setting process, the user setting unit 110 receives setting information on parking from a user (step ST101, user setting step). The user uses the input device 821 to input preference information indicating that "I would like to park my vehicle in a parking space for which the time required for completing the parking is shortest" and another condition for the parking, as the user's preference information for parking. Next, the user setting unit 110 causes the user setting storage unit 111 to store the contents inputted in step ST101 as the user setting information (step ST102), and the user setting process ends.

The parking assistance process is performed when the user is driving the user's vehicle after the user setting process has ended. Firstly, it is determined whether or not the user's vehicle has entered the parking lot or is near the parking lot and is running at a low speed, by using, for example, the periphery image taken by the camera 161 and the map information received by the external information receiving unit 162 (step ST111). In a case where the user's vehicle is not running at a low speed in the parking lot or near the parking lot, the parking assistance is not to be started, and, thus, the operation canceling unit 190 performs an operation canceling process (step ST120, operation canceling step).

In a case where the user's vehicle is running at a low speed in the parking lot or near the parking lot, the display device 181 is caused to display the display screen 900A, and the parking space searching unit 120 performs the parking space searching process (step ST112, parking space searching step). In the parking space searching process, firstly, the parking space detection unit 121 searches for a parking space around the user's vehicle (step ST1121, parking space detection step). The searching range is determined based on the user setting information. For example, positions, around the center of the user's vehicle, which are distant from the center by 5 m or less are set as the searching range. After the searching has ended, whether or not the parking space has been detected is determined (step ST1122). When the parking spaces have not been detected at all, the process ends.

In a case where the parking space has been detected, the parked vehicle detection unit 122 determines whether or not another vehicle is parked in the detected parking space (step ST1123, parked vehicle detection step). In a case where another vehicle is parked, the parking space is not regarded as the parking-allowable parking space. In a case where another vehicle is not parked, the detected parking space is set as the parking-allowable parking space, and the information thereon is stored in the parking-allowable parking space storage unit 123 (step ST1124). In a case where a plurality of parking spaces are detected in step ST1121, step ST1123 and step ST1124 are performed for each parking space. Thus, the information on all the parking-allowable parking spaces having been detected is stored in the parking-allowable parking space storage unit 123 when the searching has ended.

After the parking space searching process has ended, the target parking space selection unit 130 determines whether or not information on one or more parking-allowable parking spaces is stored in the parking-allowable parking space storage unit 123 (step ST113). In a case where the parking-allowable parking spaces have not been stored at all, the process proceeds to step ST120, and the operation canceling process is performed.

In a case where one or more parking-allowable parking spaces are stored, the target parking space selection process is performed. Firstly, the time required for parking is calculated for each parking-allowable parking space by the time-required-for-parking calculation unit 131 (step ST114), and the parking-allowable parking space for which the time required for parking is shortest is then selected as the target parking space (step ST115, target parking space selection step). When the target parking space has been selected, the display unit 180 updates the display screen to be displayed on the display device 181 (step ST116). Thus, the display screen 900B shown in FIG. 3 is displayed.

Next, the parking operation assistance start determination unit 140 performs the parking operation assistance start determination process. The parking operation assistance start determination unit 140 determines whether or not the user's vehicle is in the parking start orientation (step ST117, parking operation assistance start determination step). In a case where the user's vehicle is not in the parking start orientation, the parking operation is not started, and the process proceeds to step ST120 and the operation canceling process is performed.

In a case where the user's vehicle is in the parking start orientation, the parking operation assisting unit 150 starts the parking operation assisting process (step ST118, parking operation assisting step). Thereafter, whether or not the parking has been completed is periodically determined (step ST119). When the parking has been completed, the parking assistance process ends.

In a case where the operation canceling process is performed in step ST120, the process returns to step ST111, and the subsequent operation is performed again. In a case where the target parking space has already been selected, the selection is canceled, and the target parking space is selected again. That is, in a case where the user is not in the parking start orientation in step ST117, the target parking space can be selected again.

According to embodiment 1, the user's vehicle can be smoothly parked in a desired parking space while reduction of convenience is prevented. More specifically, a parking operation assistance start determination unit is provided for determining whether or not the parking operation assistance is to be started according to the determination criterion based on the state of the user's vehicle, that is, according to whether or not the user's vehicle is in the parking start orientation. Thus, in a case where the user would like to park the user's vehicle in the target parking space, the parking operation assisting unit is started up and the user's vehicle is smoothly parked. Therefore, the user's vehicle can be smoothly parked in a desired parking space while reduction of convenience is prevented.

Furthermore, the target parking space selection unit is provided for obtaining the user preference information and selecting the target parking space by using the user preference information as the selection condition. Therefore, as long as a user presets the user's preference information, the user need not select the target parking space when assistance in parking is provided. Therefore, convenience is further enhanced.

Embodiment 2

Figure 8:
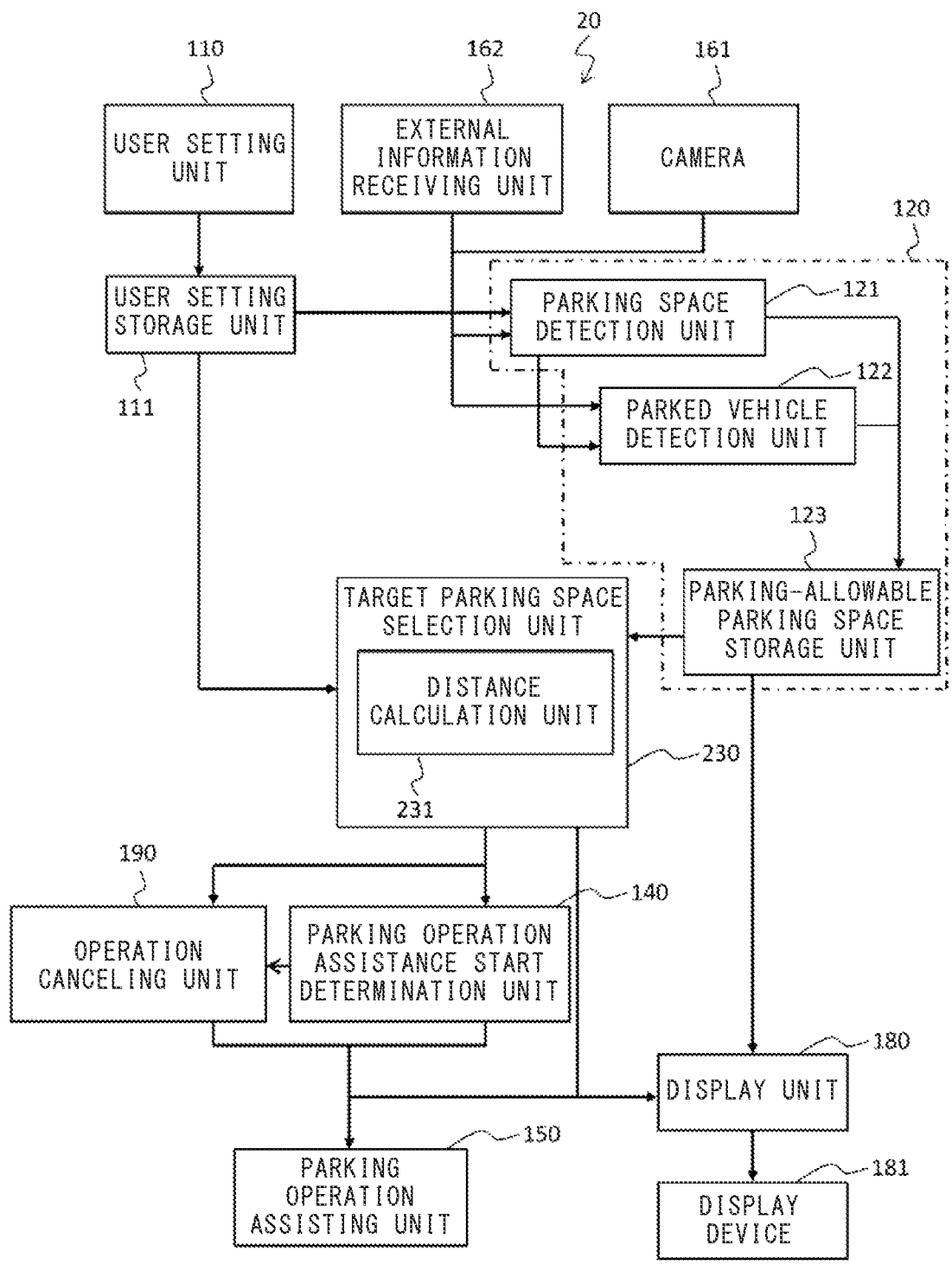
FIG. 8 is a block diagram illustrating a configuration of a parking assistance apparatus according to embodiment 2.
Figure 9:
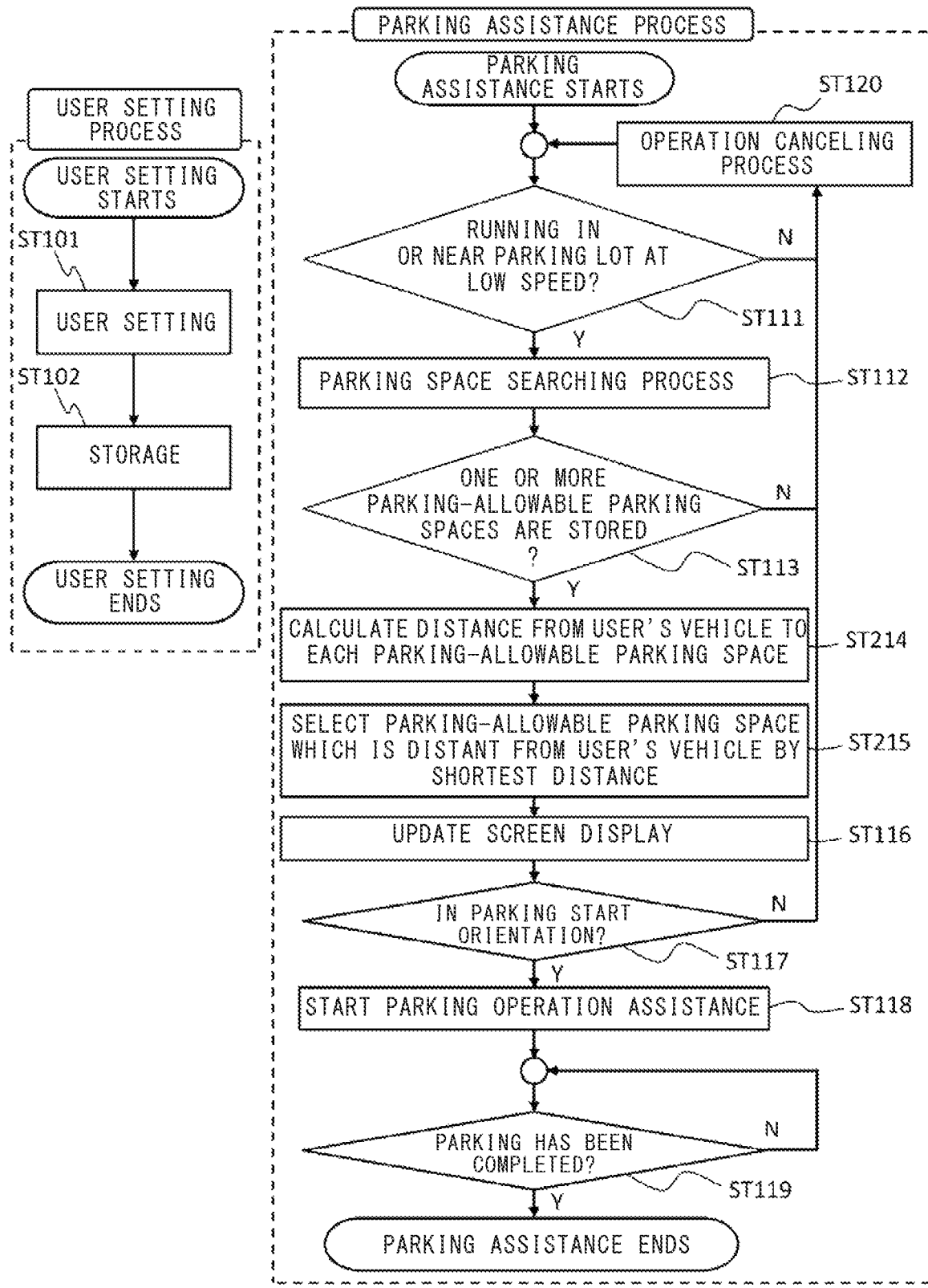
FIG. 9 is a flow chart showing a parking assistance method according to embodiment 2.

Embodiment 2 will be described below with reference to FIG. 8 and FIG. 9. The same components as those shown in FIG. 1 to FIG. 7 or components corresponding thereto are denoted by the same reference characters, and the description thereof is omitted when unnecessary. FIG. 8 is a block diagram illustrating a configuration of a parking assistance apparatus 20 according to embodiment 2. Reference character 110 denotes a user setting unit for receiving input of user setting information. Reference character 120 denotes a parking space searching unit for searching for a parking-allowable parking space around the user's vehicle. Reference character 230 denotes a target parking space selection unit for selecting a target parking space from the parking-allowable parking spaces according to a selection condition designated by a user. Reference character 140 denotes a parking operation assistance start determination unit for determining whether or not a vehicle is in a state where the vehicle can be assisted in a parking operation. Reference character 150 denotes a parking operation assisting unit for assisting a user in a parking operation based on the determination result by the parking operation assistance start determination unit 140. Reference character 180 denotes a display unit for causing the display device 181 to display various information. Reference character 190 denotes an operation canceling unit for canceling a parking assistance operation being executed, and starting a parking assistance operation from the beginning in a case where a predetermined condition is satisfied. In embodiment 2, the user preference information indicating that "I would like to park my vehicle in the parking space closest to a position at which my vehicle has stopped, when assistance in parking is provided", is inputted. Therefore, the selection condition for selecting the target parking space is "the distance from the position at which the user's vehicle has stopped is shortest".

The target parking space selection unit 230 obtains information on the parking-allowable parking space from the parking-allowable parking space storage unit 123, obtains the user preference information from the user setting storage unit 111, sets the condition representing "the distance from the position at which the user's vehicle has stopped is shortest", as the selection condition, according to the obtained preference information, and selects the target parking space according to this selection condition.

The target parking space selection unit 230 includes a distance calculation unit 231 for calculating a Euclidean distance between the designated two points. The distance calculation unit 231 calculates a distance from the user's vehicle to each of one or more parking-allowable parking spaces stored in the parking-allowable parking space storage unit 123. The distance from the user's vehicle to each parking-allowable parking space may be calculated as a Euclidean distance between a specific point in each parking-allowable parking space and a specific point of the user's vehicle. The specific point in the parking-allowable parking space may be, for example, the center of the parking-allowable parking space, the center of the entrance, or the corner of the entrance, and is not particularly limited. The specific point of the user's vehicle may be, for example, the center of the vehicle or the center of the rear wheel axle of the vehicle, and is not particularly limited. The position of the specific point in the parking-allowable parking space and the position of the specific point of the user's vehicle may be obtained from the GPS unit 822. The target parking space selection unit 230 sets, as the target parking space, the parking-allowable parking space which is distant, by the shortest distance, from the position at which the user's vehicle has stopped, according to the selection condition for selecting the target parking space. The other portions are the same as in embodiment 1.

Next, an operation will be described. FIG. 9 is a flow chart showing a parking assistance method according to embodiment 2. The parking assistance method according to embodiment 2 includes the "user setting process" and the "parking assistance process" as in embodiment 1. Furthermore, the parking assistance process also includes the "parking space searching process", the "target parking space selection process", the "parking operation assistance start determination process", and the "parking operation assisting process", as in embodiment 1. Firstly, input of preference information indicating that "I would like to park my vehicle in a parking space closest to the position at which my vehicle has stopped", and another condition for the parking, is received from a user (step ST101), and is stored as the user setting information in the user setting storage unit 111 (step ST102), and the user setting process ends.

The parking assistance process is performed when the user is driving the user's vehicle after the user setting process has ended. Firstly, it is determined whether or not the vehicle has entered the parking lot or is near the parking lot and is running at a low speed (step ST111). In a case where the user's vehicle is not running at a low speed in the parking lot or near the parking lot, the operation canceling unit 190 performs the operation canceling process (step ST120).

In a case where the user's vehicle is running at a low speed in the parking lot or near the parking lot, the display device 181 is caused to display the display screen 900A, and the parking space searching unit 120 performs the parking space searching process (step ST112). The parking space searching process of embodiment 2 is the same as that in embodiment 1, and the description thereof is omitted.

After the parking space searching process has ended, the target parking space selection unit 230 determines whether or not information on one or more parking-allowable parking spaces is stored in the parking-allowable parking space storage unit 123 (step ST113). In a case where the parking-allowable parking spaces have not been stored at all, the process proceeds to step ST120, and the operation canceling process is performed.

In a case where one or more parking-allowable parking spaces are stored, the target parking space selection process is performed. Firstly, the distance calculation unit 231 calculates a distance between the position of the user's vehicle and the position of each parking-allowable parking space (step ST214). Next, a parking-allowable parking space that is distant from the user's vehicle by the shortest distance is selected as the target parking space (step ST215). When the target parking space has been selected, the display unit 180 updates the display screen to be displayed on the display device 181 (step ST116).

Step ST117 and the subsequent steps are the same as in embodiment 1, and the description thereof is omitted.

According to embodiment 2, the same effect as in embodiment 1 can be obtained.

Embodiment 3

Figure 10:
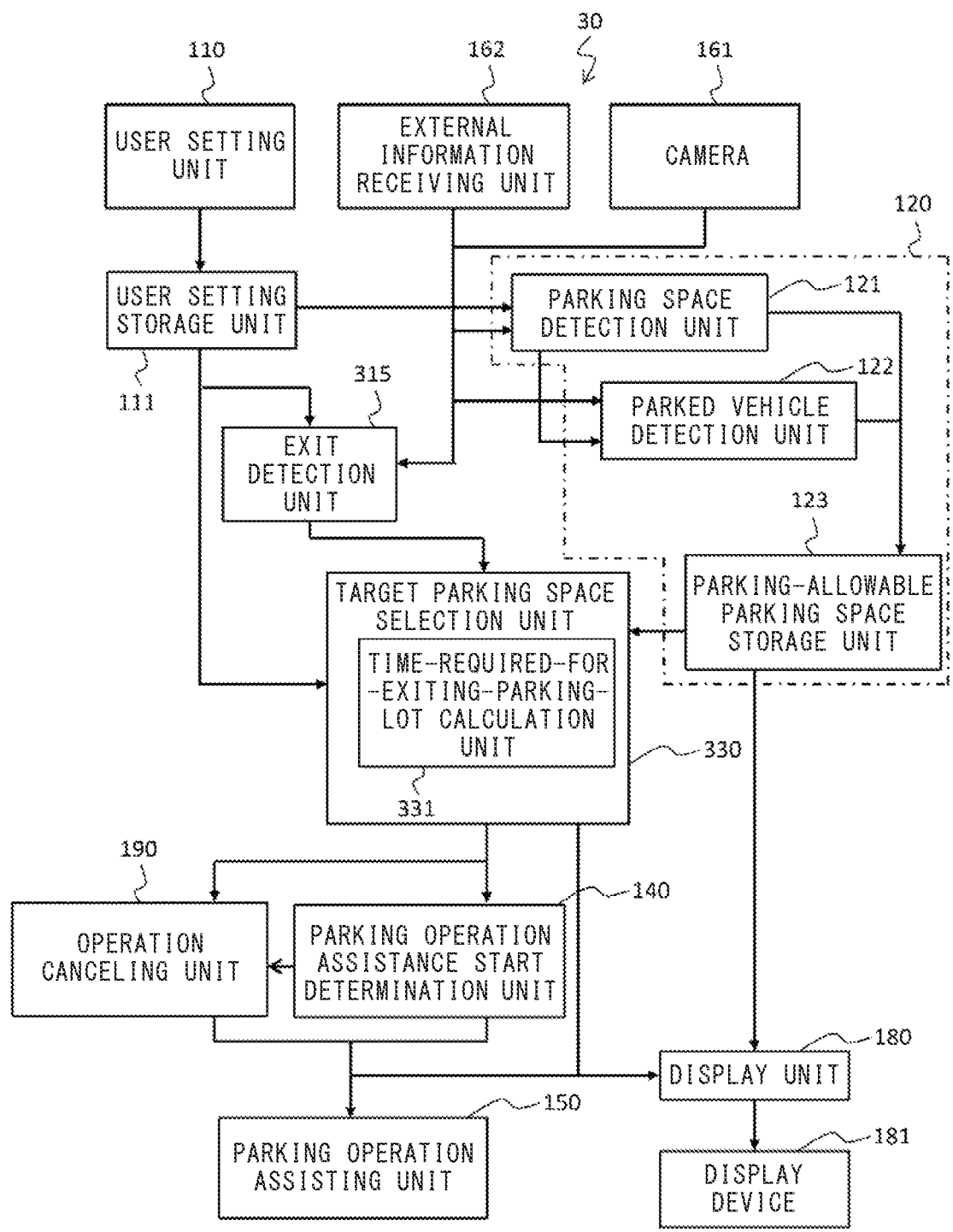
FIG. 10 is a block diagram illustrating a configuration of a parking assistance apparatus according to embodiment 3.
Figure 11:
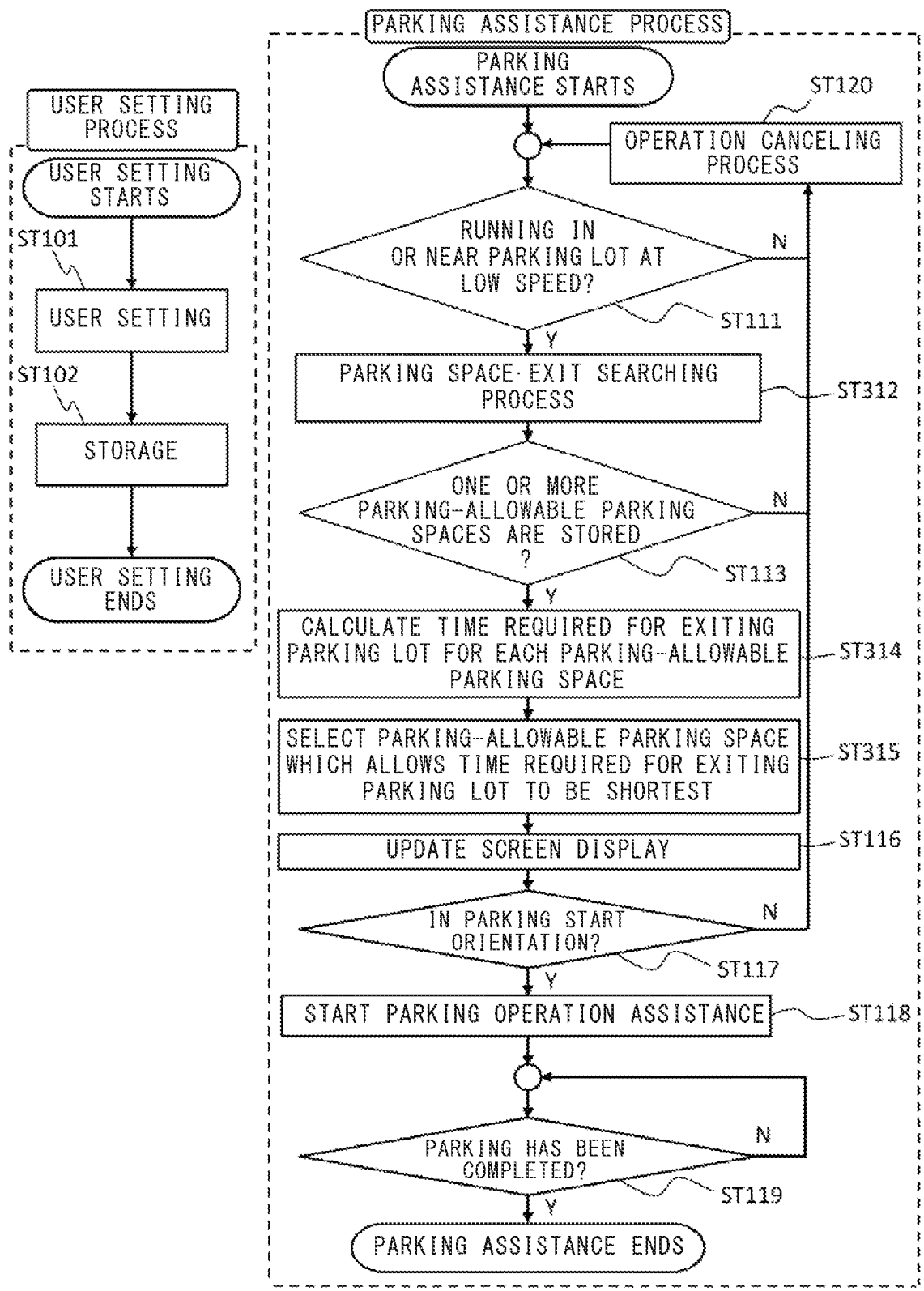
FIG. 11 is a flow chart showing a parking assistance method according to embodiment 3.

Embodiment 3 will be described below with reference to FIG. 10 and FIG. 11. The same components as those shown in FIG. 1 to FIG. 9 or components corresponding thereto are denoted by the same reference characters, and the description thereof is omitted when unnecessary. FIG. 10 is a block diagram illustrating a configuration of a parking assistance apparatus 30 according to embodiment 3. Reference character 330 denotes a target parking space selection unit for selecting a target parking space from the parking-allowable parking spaces according to a selection condition designated by a user. In embodiment 3, the user preference information indicating that "I would like to park my vehicle in a parking space that allows a time required for completing exit from the parking lot to be shortest, when assistance in parking is provided", is inputted. Therefore, the selection condition for selecting the target parking space is "the time required for exiting the parking lot is shortest".

The parking assistance apparatus 30 includes an exit detection unit 315 for detecting an exit of the parking lot and obtaining position information of the exit. The exit detection unit 315 is started up when information on the exit of the parking lot is determined as being necessary according to the user information in the user setting storage unit 111, and detects the exit of the parking lot based on the periphery image taken by the camera 161 and the map information which represents the periphery of the user's vehicle and which is obtained from the external information receiving unit 162, to obtain the position information of the exit. In a case where the number of exits is plural, an exit from which the vehicle is to exit may be designated by the user setting information. Furthermore, the user setting information may include the position information of the exit.

The target parking space selection unit 330 obtains the information on the parking-allowable parking space from the parking-allowable parking space storage unit 123, obtains the user preference information from the user setting storage unit 111, sets the condition representing "the time required for exiting the parking lot is shortest", as the selection condition, according to the obtained preference information, and selects the target parking space according to this selection condition.

The target parking space selection unit 330 includes a time-required-for-exiting-parking-lot calculation unit 331 for calculating a time required for exiting a parking lot. The time required for exiting a parking lot is a time required when the user's parked vehicle exits the parking lot. The time-required-for-exiting-parking-lot calculation unit 331 obtains the position information of the exit of the parking lot, from the exit detection unit 315, and calculates the time required for exiting the parking lot for each of one or more parking-allowable parking spaces stored in the parking-allowable parking space storage unit 123. The time required for exiting the parking lot can be calculated by dividing a length of a predicted route, from the subject parking-allowable parking space, to be taken until the user's vehicle exits the parking lot, by a predicted speed of the user's vehicle which is performing an exiting operation. The predicted route may be set based on the position and the orientation of the subject parking-allowable parking space and the position of the exit. The predicted speed may be designated by a user through the user setting unit 110, or the predicted speed may be determined based on an average speed in the previous exiting operations. The target parking space selection unit 330 sets the parking-allowable parking space that allows the time required for exiting the parking lot to be shortest, as the target parking space, according to the selection condition for selecting the target parking space.

The other portions are the same as in embodiment 1.

Next, an operation will be described. FIG. 11 is a flow chart showing a parking assistance method according to embodiment 3. The parking assistance method according to embodiment 3 includes the "user setting process" and the "parking assistance process" as in embodiment 1. Furthermore, the parking assistance process similarly includes a "parking space-exit searching process", the "target parking space selection process", the "parking operation assistance start determination process", and the "parking operation assisting process". Firstly, input of preference information indicating that "I would like to park my vehicle in a parking space that allows a time required for completing exit from the parking lot to be shortest" and another condition for the parking is received from a user (step ST101), and is stored as the user setting information in the user setting storage unit 111 (step ST102), and the user setting process ends.

The parking assistance process is performed when the user is driving the user's vehicle after the user setting process has ended. Firstly, it is determined whether or not the vehicle has entered the parking lot or is near the parking lot and is running at a low speed (step ST111). In a case where the user's vehicle is not running at a low speed in the parking lot or near the parking lot, the operation canceling unit 190 performs the operation canceling process (step ST120).

In a case where the user's vehicle is running at a low speed in the parking lot or near the parking lot, the display device 181 is caused to display the display screen 900A, and the parking space searching unit 120 and the exit detection unit 315 perform the parking space-exit searching process (step ST312). The parking space-exit searching process is a process in which detection of an exit of the parking lot is performed in addition to the parking space searching process described in embodiment 1, and the contents of the parking space searching process are the same as in embodiment 1. The exit is detected by using the periphery image taken by the camera 161 and the map information which represents the periphery of the user's vehicle and which is obtained from the external information receiving unit 162, as described above.

After the parking space searching process has ended, the target parking space selection unit 330 determines whether or not information on one or more parking-allowable parking spaces is stored in the parking-allowable parking space storage unit 123 (step ST113). In a case where the parking-allowable parking spaces have not been stored at all, the process proceeds to step ST120, and the operation canceling process is performed.

In a case where one or more parking-allowable parking spaces are stored, the target parking space selection process is performed. Firstly, the time-required-for-exiting-parking-lot calculation unit 331 calculates a time required for exiting the parking lot for each parking-allowable parking space (step ST314), and then selects the parking-allowable parking space that allows the time required for exiting the parking lot to be shortest, as the target parking space (step ST315). When the target parking space has been selected, the display unit 180 updates the display screen to be displayed on the display device 181 (step ST116). Thus, the display screen 900B shown in FIG. 3 is displayed. In embodiment 3, the parking-allowable parking space that allows the time required for exiting the parking lot to be shortest is selected, and, thus, the parking-allowable parking space 912 is highlighted when displayed.

Step ST117 and the subsequent steps are the same as in embodiment 1, and the description thereof is omitted.

According to embodiment 3, the same effect as in embodiment 1 can be obtained.

Embodiment 4

Figure 12:
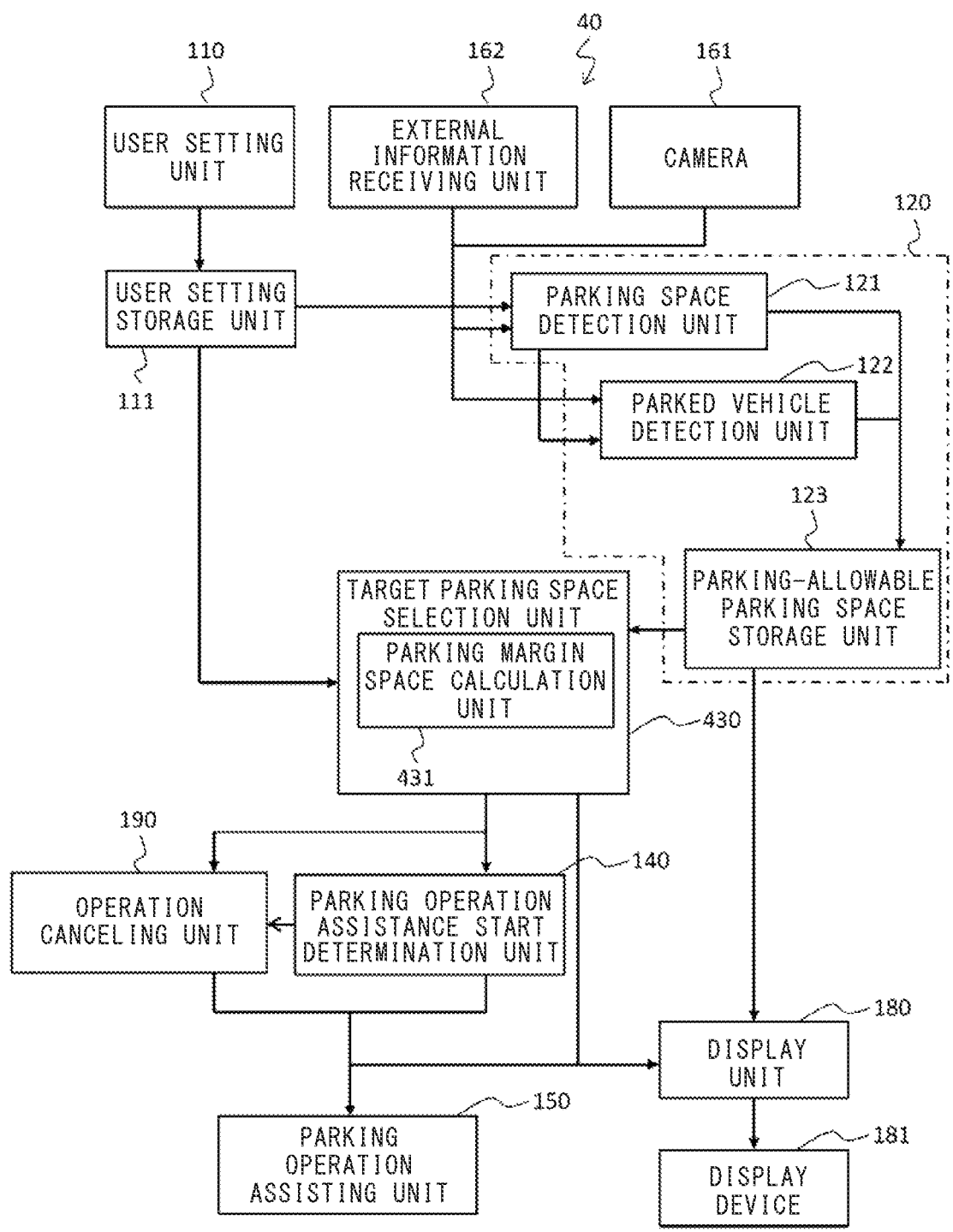
FIG. 12 is a block diagram illustrating a configuration of a parking assistance apparatus according to embodiment 4.
Figure 13:
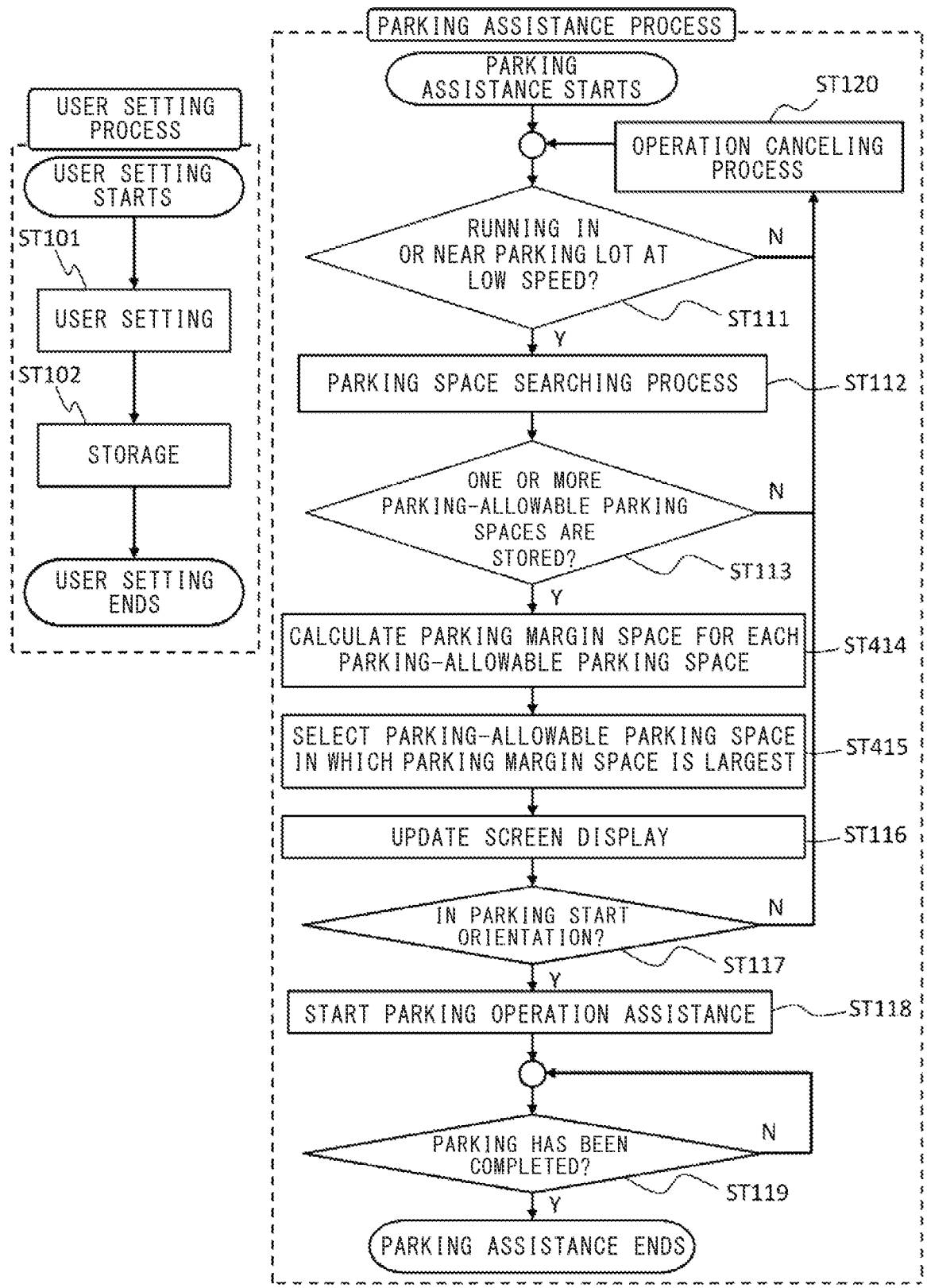
FIG. 13 is a flow chart showing a parking assistance method according to embodiment 4.

Embodiment 4 will be described below with reference to FIG. 12 and FIG. 13. The same components as those shown in FIG. 1 to FIG. 11 or components corresponding thereto are denoted by the same reference characters, and the description thereof is omitted when unnecessary. FIG. 12 is a block diagram illustrating a configuration of a parking assistance apparatus 40 according to embodiment 4. Reference character 430 denotes a target parking space selection unit for selecting a target parking space from the parking-allowable parking spaces according to a selection condition designated by a user. In embodiment 4, the user preference information indicating that "I would like to park my vehicle in a parking space in which a getting-out space is widest after the parking has been completed, when assistance in parking is provided", is inputted. Therefore, the selection condition for selecting the target parking space is "the parking margin space is largest".

The target parking space selection unit 430 obtains information on the parking-allowable parking space from the parking-allowable parking space storage unit 123, obtains the user preference information from the user setting storage unit 111, sets the condition representing "the parking margin space is largest", as the selection condition, according to the obtained preference information, and selects the target parking space according to this selection condition.

The target parking space selection unit 430 includes a parking margin space calculation unit 431 for calculating a parking margin space. The parking margin space calculation unit 431 obtains a width of the user's vehicle from the user setting storage unit 111, and calculates a parking margin space for each of one or more parking-allowable parking spaces stored in the parking-allowable parking space storage unit 123. The parking margin space can be calculated by obtaining a difference between the width of the subject parking-allowable parking space and the width of the user's vehicle. Taking into consideration that other vehicles parked on both sides of the user's vehicle may move, the parking margin space may be corrected. The target parking space selection unit 430 sets the parking-allowable parking space in which the parking margin space is largest, as the target parking space, according to the selection condition for selecting the target parking space.

The other portions are the same as in embodiment 1.

Next, an operation will be described. FIG. 13 is a flow chart showing a parking assistance method according to embodiment 4. The parking assistance method according to embodiment 4 includes the "user setting process" and the "parking assistance process" as in embodiment 1. Furthermore, the parking assistance process includes the "parking space searching process", the "target parking space selection process", the "parking operation assistance start determination process", and the "parking operation assisting process" as in embodiment 1. Firstly, input of preference information indicating that "I would like to park my vehicle in a parking space in which a getting-out space is widest after the parking has been completed" and another condition for the parking is received from a user (step ST101), and is stored as the user setting information in the user setting storage unit 111 (step ST102), and the user setting process ends.

The parking assistance process is performed when the user is driving the user's vehicle after the user setting process has ended. Firstly, it is determined whether or not the vehicle has entered the parking lot or is near the parking lot and is running at a low speed (step ST111). In a case where the user's vehicle is not running at a low speed in the parking lot or near the parking lot, the operation canceling unit 190 performs the operation canceling process (step ST120).

In a case where the user's vehicle is running at a low speed in the parking lot or near the parking lot, the display device 181 is caused to display the display screen 900A, and the parking space searching unit 120 performs the parking space searching process (step ST112). The parking space searching process of embodiment 4 is the same as that in embodiment 1, and the description thereof is omitted.

After the parking space searching process has ended, the target parking space selection unit 430 determines whether or not information on one or more parking-allowable parking spaces is stored in the parking-allowable parking space storage unit 123 (step ST113). In a case where the parking-allowable parking spaces have not been stored at all, the process proceeds to step ST120, and the operation canceling process is performed.

In a case where one or more parking-allowable parking spaces are stored, the target parking space selection process is performed. Firstly, the parking margin space calculation unit 431 calculates a parking margin space in each parking-allowable parking space (step ST414), and then selects the parking-allowable parking space in which the parking margin space is largest, as the target parking space (step ST415). When the target parking space has been selected, the display unit 180 updates the display screen to be displayed on the display device 181 (step ST116). Thus, the display screen 900B shown in FIG. 3 is displayed. In embodiment 4, the parking-allowable parking space in which the parking margin space is largest is selected, and, thus, the parking-allowable parking space 913 is highlighted when displayed.

Step ST117 and the subsequent steps are the same as in embodiment 1, and the description thereof is omitted.

According to embodiment 4, the same effect as in embodiment 1 can be obtained.

Embodiment 5

Figure 14:
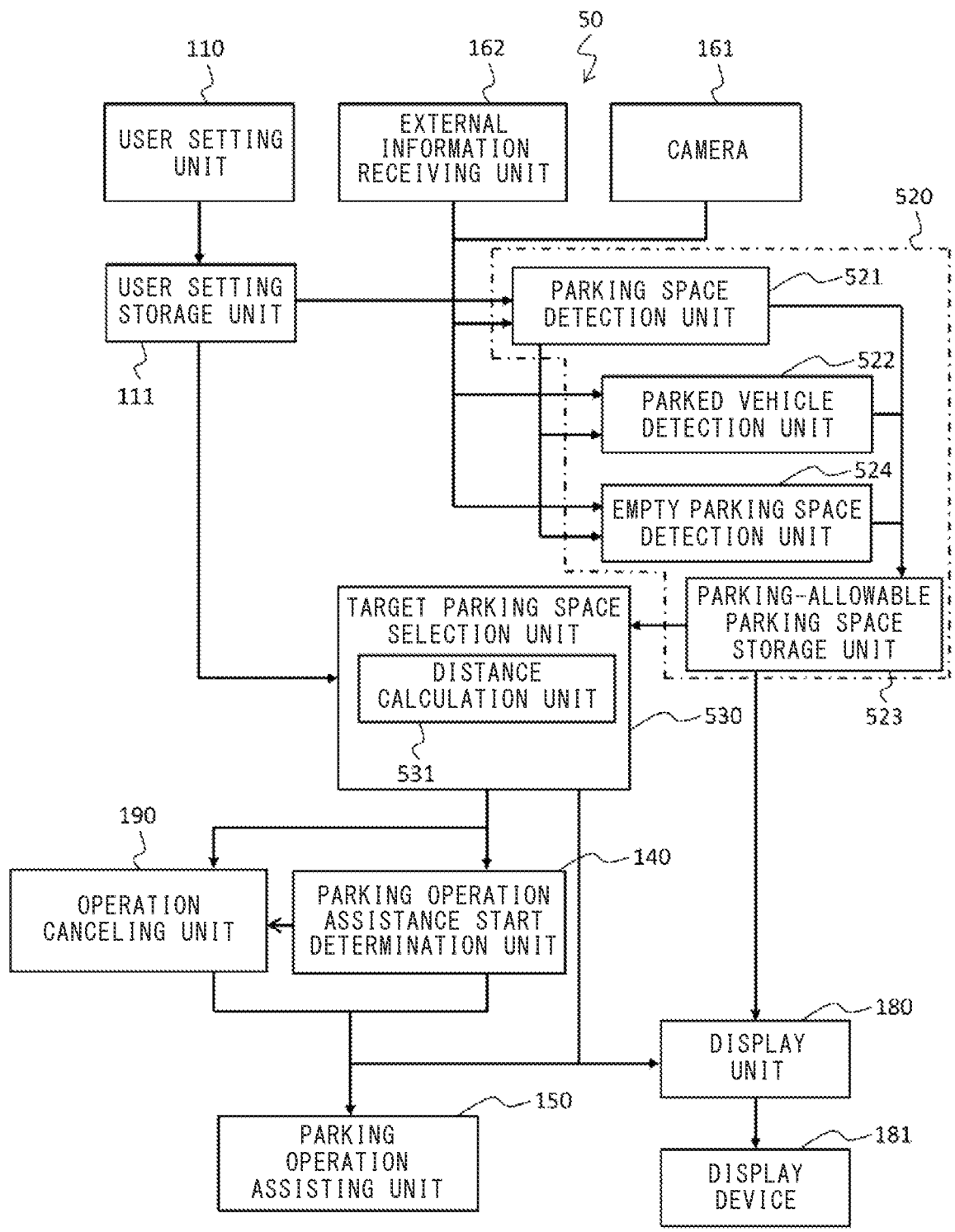
FIG. 14 is a block diagram illustrating a configuration of a parking assistance apparatus according to embodiment 5.
Figure 15:
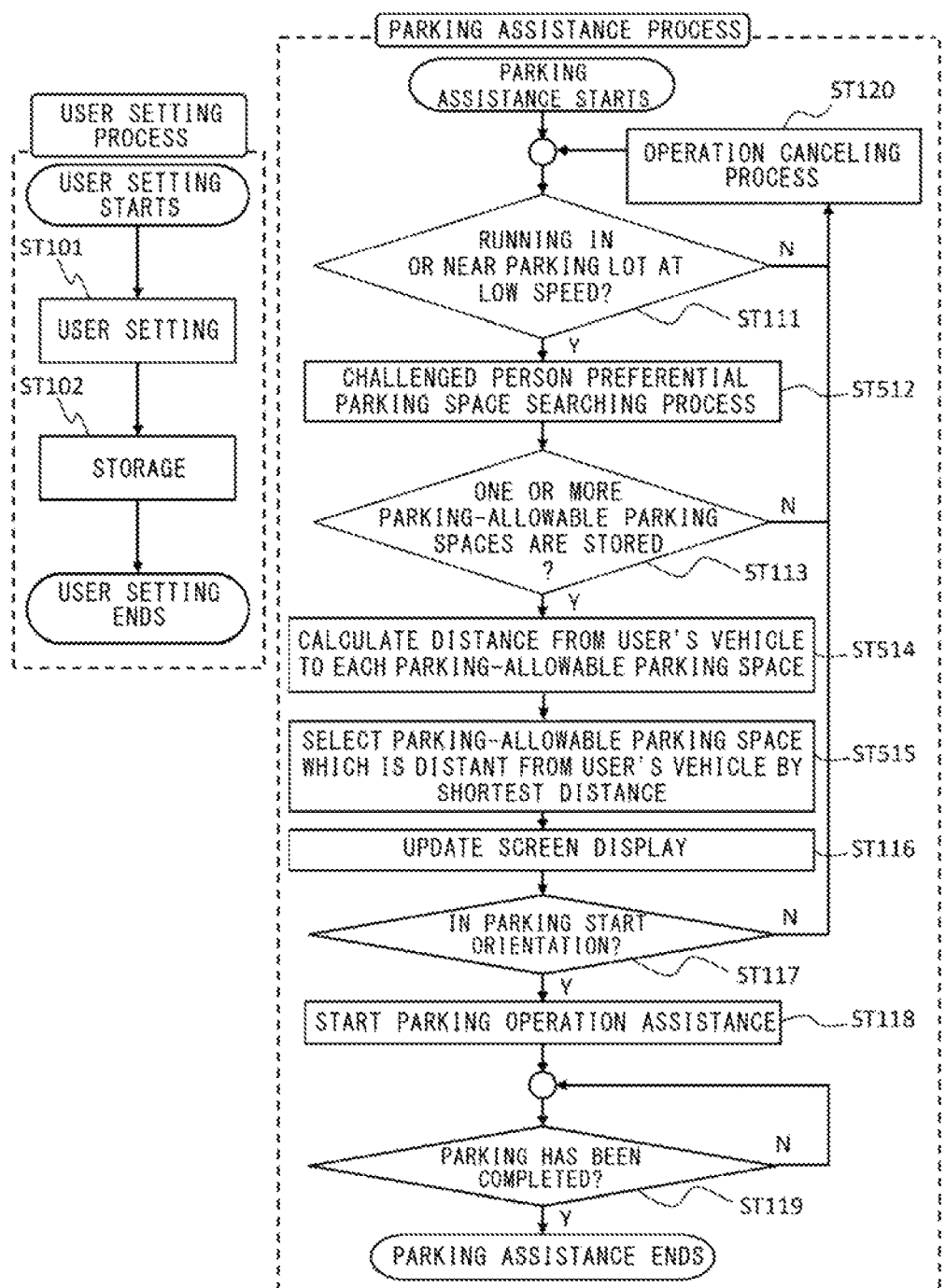
FIG. 15 is a flow chart showing a parking assistance method according to embodiment 5.
Figure 16:
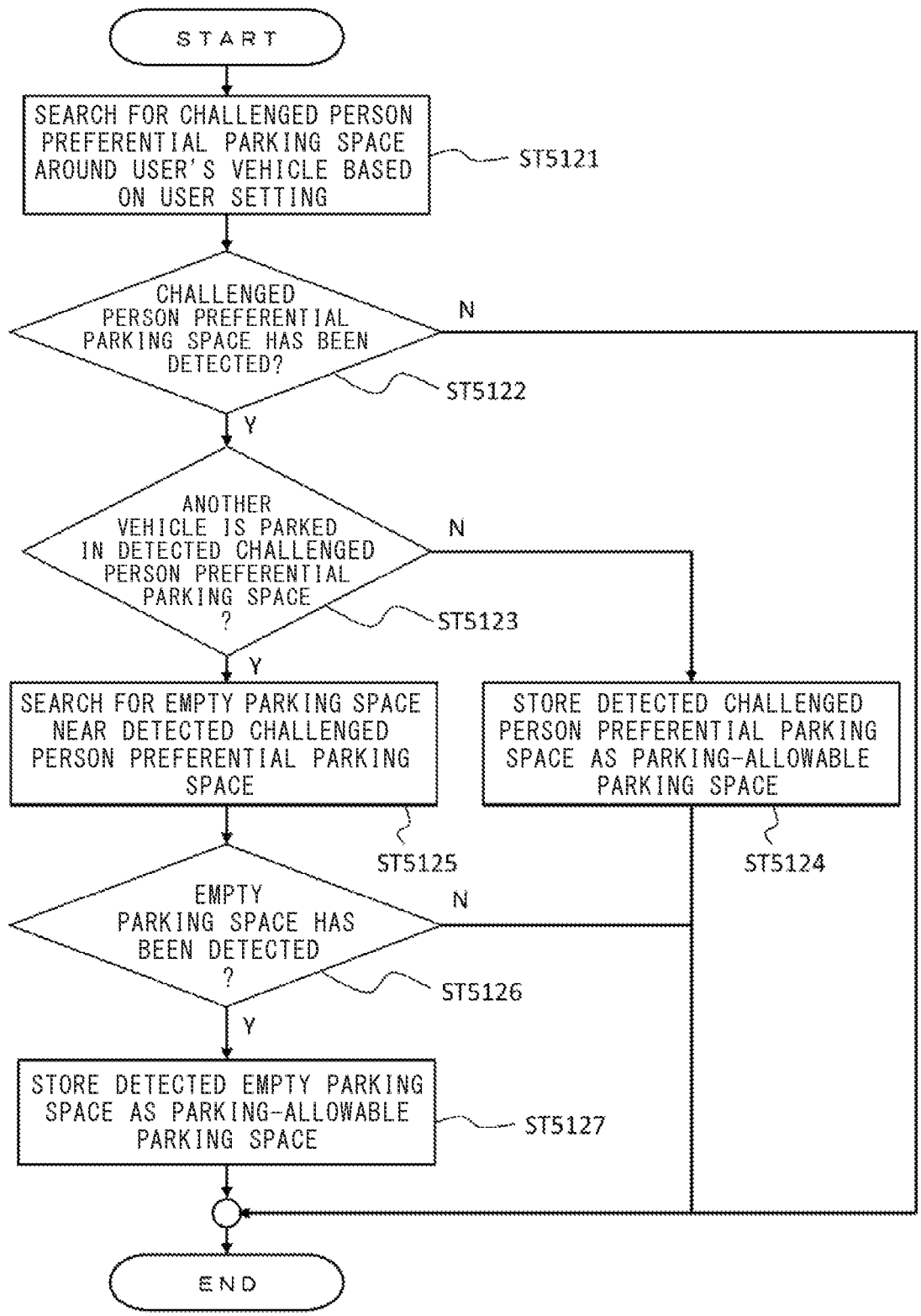
FIG. 16 is a flow chart showing a challenged person preferential parking space searching process according to embodiment 5.

Embodiment 5 will be described below with reference to FIG. 14 to FIG. 16. The same components as those shown in FIG. 1 to FIG. 13 or components corresponding thereto are denoted by the same reference characters, and the description thereof is omitted when unnecessary. FIG. 14 is a block diagram illustrating a configuration of a parking assistance apparatus 50 according to embodiment 5. Reference character 520 denotes a parking space searching unit for searching for a parking-allowable parking space around the user's vehicle. Reference character 530 denotes a target parking space selection unit for selecting a target parking space from the parking-allowable parking spaces according to a selection condition designated by a user. In embodiment 5, the user preference information indicating that "I would like to park my vehicle in a challenged person preferential parking space or a space close thereto" is inputted. Similarly to embodiment 2, "I would like to park my vehicle in the parking space closest to a position at which my vehicle has stopped, when assistance in parking is provided" is also inputted. Thus, the selection conditions for selecting the target parking space are "challenged person preferential parking space or a space close thereto" and "the distance from the position at which the user's vehicle has stopped is shortest".

The parking space searching unit 520 includes a parking space detection unit 521 for detecting a parking space around the user's vehicle, a parked vehicle detection unit 522 for detecting another vehicle parked in the parking space that is detected by the parking space detection unit 521, and a parking-allowable parking space storage unit 523 for storing information on a parking space in which another parked vehicle is not detected by the parked vehicle detection unit 522, among the parking spaces detected by the parking space detection unit 521. Furthermore, the parking space searching unit 520 includes an empty parking space detection unit 524 for detecting for absence or presence of an obstacle near a parking space in which another parked vehicle is detected by the parked vehicle detection unit 522 and the user's vehicle cannot be parked, to detect an empty parking space.

The parking space detection unit 521 performs searching and detection of a parking space around the user's vehicle by using a periphery image taken by the camera 161, and, for example, the map information representing the periphery of the user's vehicle and the position information of the user's vehicle as obtained by the external information receiving unit 162, similarly to the parking space detection unit 121 of embodiment 1. The parking space detection unit 521 obtains the user preference information from the user setting storage unit 111, sets the condition representing "challenged person preferential parking space or a space close thereto", as the selection condition, according to the obtained preference information, and detects only a challenged person preferential parking space according to this selection condition. Whether or not the parking space is a challenged person preferential parking space is determined by detection through pattern matching of a challenged person priority mark painted in the parking space or a challenged person priority mark which is presented, based on the image information of the detected parking space. Alternatively, whether or not the parking space is a challenged person preferential parking space may be determined by using the position information, of the challenged person preferential parking space, obtained from the external information receiving unit 162. The parking space detection unit 521 outputs the information on the challenged person preferential parking space having been detected, to the parked vehicle detection unit 522, the parking-allowable parking space storage unit 523, and the empty parking space detection unit 524.

The parked vehicle detection unit 522 detects a parked vehicle that is parked in the parking space, for a challenged person, detected by the parking space detection unit 521, similarly to the parked vehicle detection unit 122 of embodiment 1.

The empty parking space detection unit 524 detects for presence or absence of an obstacle near the challenged person preferential parking space in which another parked vehicle is detected by the parked vehicle detection unit 522, to detect an empty parking space. The empty parking space is detected by using a periphery image taken by the camera 161, and, for example, the map information representing the periphery of the user's vehicle and the position information of the user's vehicle as obtained by the external information receiving unit 162. A range in which the empty parking space is detected by the empty parking space detection unit 524 is preset by the user setting information. In embodiment 5, positions, around the center of the subject parking space, which are distant from the center by 5 m or less are set as one example of a range in which the empty parking space is detected.

The parking-allowable parking space storage unit 523 obtains information on the challenged person preferential parking space from the parking space detection unit 521, and stores, as the parking-allowable parking space, only a challenged person preferential parking space in which the user's vehicle can be parked, among the detected challenged person preferential parking spaces, according to the result of detection of the parked vehicle by the parked vehicle detection unit 522. Furthermore, the empty parking space detected by the empty parking space detection unit 524 is also stored as the parking-allowable parking space. Thus, a challenged person preferential parking space in which parking is possible, and an empty parking space near a challenged person preferential parking space in which parking is impossible are stored as the parking-allowable parking spaces in the parking-allowable parking space storage unit 523.

The target parking space selection unit 530 obtains information on the parking-allowable parking space from the parking-allowable parking space storage unit 523, obtains the user preference information from the user setting storage unit 111, sets the condition representing "the distance from the position at which the user's vehicle has stopped is shortest", as the selection condition, according to the obtained preference information, and selects the target parking space according to this selection condition.

The target parking space selection unit 530 includes a distance calculation unit 531. The distance calculation unit 531 calculates a distance from the user's vehicle to each of one or more parking-allowable parking spaces stored in the parking-allowable parking space storage unit 523, similarly to the distance calculation unit 231 of embodiment 2. The target parking space selection unit 530 sets the parking-allowable parking space that is distant, by the shortest distance, from the position at which the user's vehicle has stopped, as the target parking space, according to the selection condition for selecting the target parking space.

The other portions are the same as in embodiment 1.

Next, an operation will be described. FIG. 15 is a flow chart showing a parking assistance method according to embodiment 5. FIG. 16 is a flow chart showing a parking space searching process according to embodiment 5. The parking assistance method according to embodiment 5 includes the "user setting process" and the "parking assistance process" as in embodiment 1. Furthermore, the parking assistance process includes the "parking space searching process", the "target parking space selection process", the "parking operation assistance start determination process", and the "parking operation assisting process" as in embodiment 1. Firstly, input of preference information indicating that "I would like to park my vehicle in a challenged person preferential parking space or a space close thereto" and "I would like to park my vehicle in a parking space closest to the position at which my vehicle has stopped", and another condition for the parking is received from a user (step ST101), and is stored as the user setting information in the user setting storage unit 111 (step ST102), and the user setting process ends.

The parking assistance process is performed when the user is driving the user's vehicle after the user setting process has ended. Firstly, it is determined whether or not the vehicle has entered the parking lot or is near the parking lot and is running at a low speed (step ST111). In a case where the user's vehicle is not running at a low speed in the parking lot or near the parking lot, the operation canceling unit 190 performs the operation canceling process (step ST120).

In a case where the user's vehicle is running at a low speed in the parking lot or near the parking lot, the display device 181 is caused to display the display screen 900A, and the parking space searching unit 520 performs a challenged person preferential parking space searching process (step ST512). In the challenged person preferential parking space searching process, firstly, the parking space detection unit 521 searches for a challenged person preferential parking space around the user's vehicle (step ST5121). The searching range is determined based on the user setting information. For example, positions, around the center of the user's vehicle, which are distant from the center by 5 m or less are set as the searching range. After the searching has ended, whether or not the challenged person preferential parking space has been detected is determined (step ST5122). In a case where the challenged person preferential parking spaces have not been detected at all, the process ends.

In a case where the challenged person preferential parking space has been detected, the parked vehicle detection unit 522 determines whether or not another vehicle is parked in the challenged person preferential parking space having been detected (step ST5123). In a case where another vehicle is not parked, the challenged person preferential parking space having been detected is set as the parking-allowable parking space, and the information thereon is stored in the parking-allowable parking space storage unit 123 (step ST5124), and the process ends.

In a case where it is determined in step ST5123 that another vehicle is parked, the empty parking space detection unit 524 searches for an empty parking space while detecting for presence or absence of an obstacle near the challenged person preferential parking space in which the other vehicle is parked (step ST5125). After the searching, whether or not the empty parking space has been detected is determined (step ST5126). In a case where the empty parking space has not been detected, the process ends. In a case where the empty parking space has been detected, the detected empty parking space is set as the parking-allowable parking space, and the information thereon is stored in the parking-allowable parking space storage unit 123 (step ST5127), and the process ends.

In a case where a plurality of challenged person preferential parking spaces are detected in step ST5121, step ST5123 to step ST5127 are performed for each challenged person preferential parking space. Furthermore, in a case where a plurality of empty parking spaces are detected in step ST5126, all of the detected empty parking spaces are stored as the parking-allowable parking spaces in step ST5127. Thus, when the searching has ended, information on all of the parking-allowable parking spaces has been stored in the parking-allowable parking space storage unit 123.

After the parking space searching process has ended, the target parking space selection unit 530 determines whether or not information on one or more parking-allowable parking spaces is stored in the parking-allowable parking space storage unit 523 (step ST113). In a case where the parking-allowable parking spaces have not been stored at all, the process proceeds to step ST120, and the operation canceling process is performed.

In a case where one or more parking-allowable parking spaces are stored, the target parking space selection process is performed. Firstly, the distance calculation unit 531 calculates a distance between the position of the user's vehicle and the position of each parking-allowable parking space (step ST514), and then selects a parking-allowable parking space that is distant from the user's vehicle by the shortest distance, as the target parking space (step ST515). When the target parking space has been selected, the display unit 180 updates the display screen to be displayed on the display device 181 (step ST116).

Step ST117 and the subsequent steps are the same as in embodiment 1, and the description thereof is omitted.

According to embodiment 5, the same effect as in embodiment 1 can be obtained.

Furthermore, the challenged person preferential parking space is identified by the parking space detection unit. Therefore, a user's request for using the challenged person preferential parking space can be also met.

In embodiment 5, in a case where a plurality of challenged person preferential parking spaces are detected, a target parking space is selected such that a distance from the user's vehicle is shortest as in embodiment 2. However, the present embodiment is not limited thereto. The target parking space may be selected in the same manner as in embodiment 1, 3, or 4.

Embodiment 6

Figure 17:
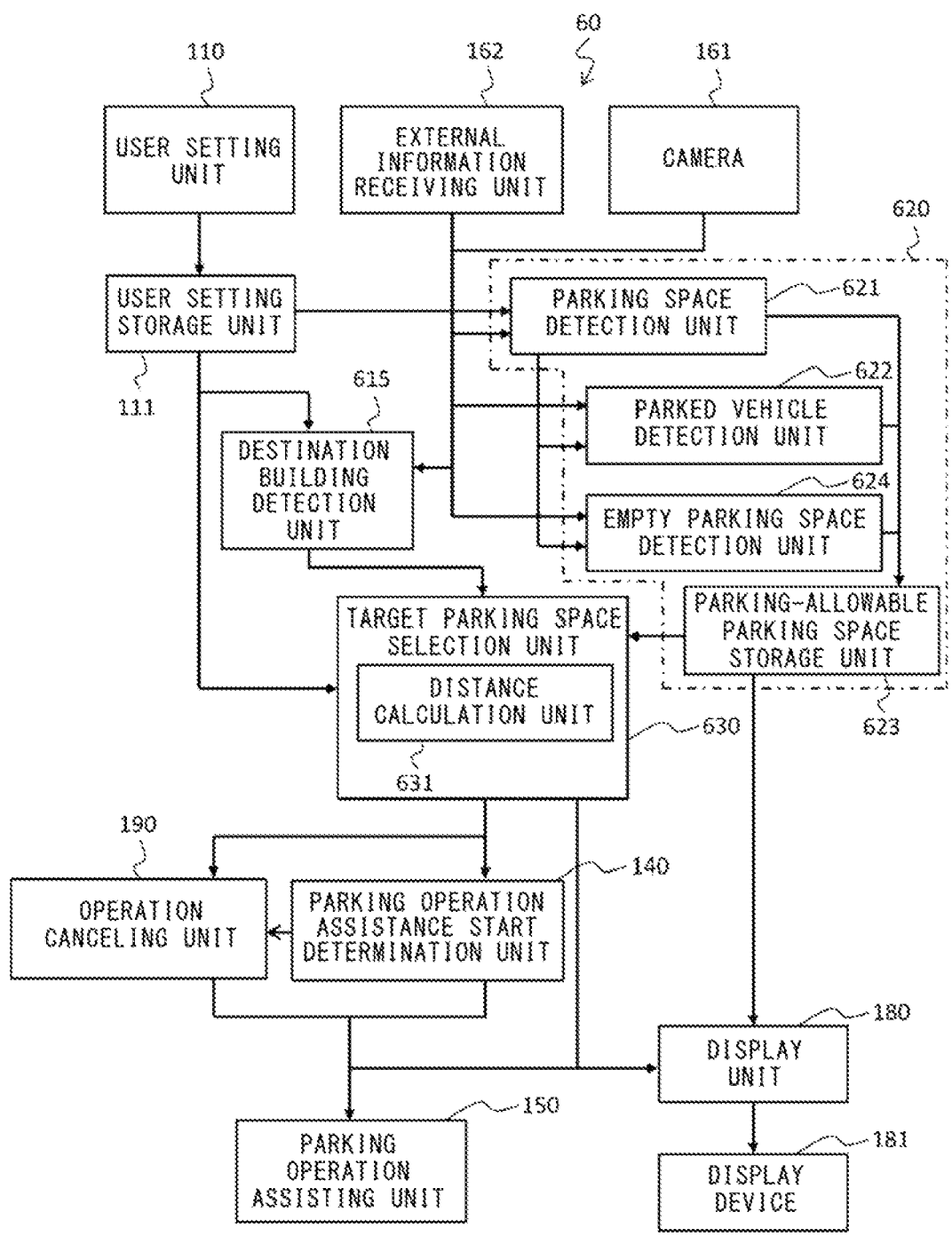
FIG. 17 is a block diagram illustrating a configuration of a parking assistance apparatus according to embodiment 6.
Figure 18:
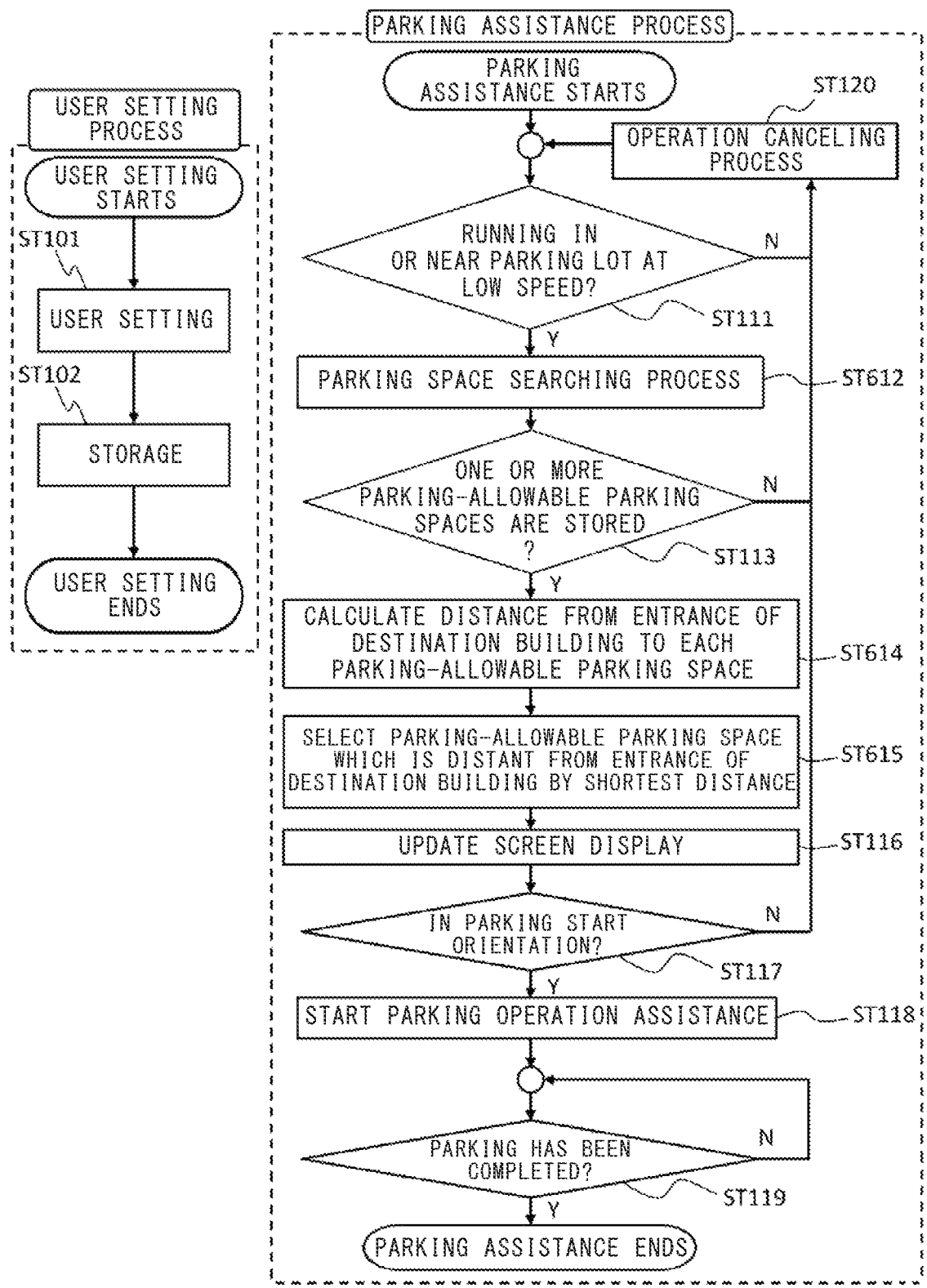
FIG. 18 is a flow chart showing a parking assistance method according to embodiment 6.
Figure 19:
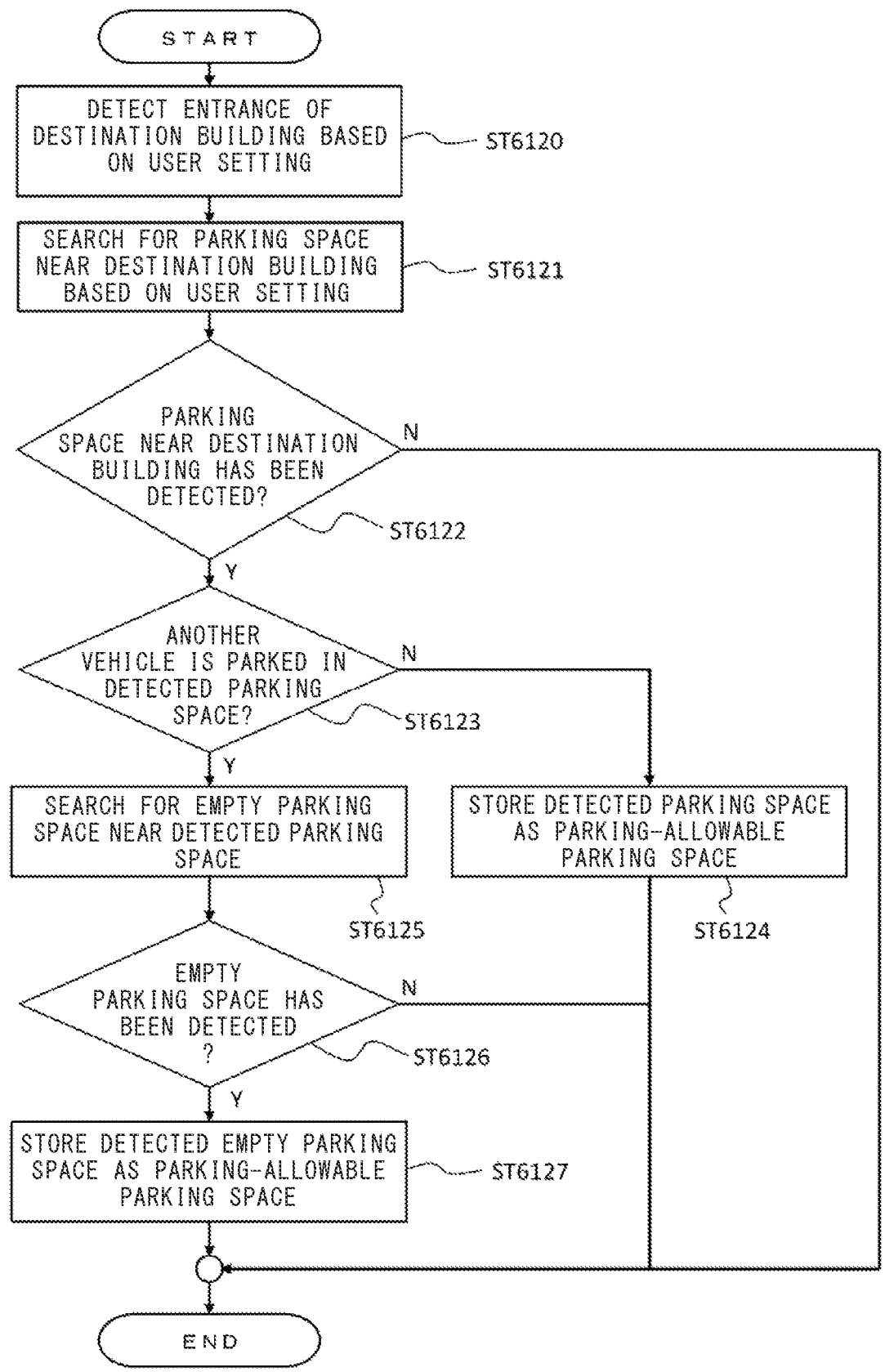
FIG. 19 is a flow chart showing a parking space searching process according to embodiment 6.

Embodiment 6 will be described below with reference to FIG. 17 to FIG. 19. The same components as those shown in FIG. 1 to FIG. 16 or components corresponding thereto are denoted by the same reference characters, and the description thereof is omitted when unnecessary. FIG. 17 is a block diagram illustrating a configuration of a parking assistance apparatus according to embodiment 6. Reference character 620 denotes a parking space searching unit for searching for a parking-allowable parking space around the user's vehicle. Reference character 630 denotes a target parking space selection unit for selecting a target parking space from the parking-allowable parking spaces according to a selection condition designated by a user. In embodiment 6, the user preference information indicating that "I would like to park my vehicle in a parking space closest to an entrance of a building (destination building) as a destination or a space close thereto" is inputted. Thus, the selection condition for selecting the target parking space is "a space that is distant from an entrance of a destination building by the shortest distance, or a space close thereto".

A parking assistance apparatus 60 includes a destination building detection unit 615 for obtaining position information of an entrance of a destination building. The destination building detection unit 615 is started up when information on a destination building is determined as being necessary according to the user information in the user setting storage unit 111, and detects the entrance of the destination building based on the periphery image taken by the camera 161 and the map information which represents the periphery of the user's vehicle and which is obtained from the external information receiving unit 162, to obtain the position information of the entrance. In a case where the number of the entrances of the destination building is plural, the user setting information may be set so as to include the designated entrance. Furthermore, the user setting information may include position information of the entrance of the destination building.

The parking space searching unit 620 includes a parking space detection unit 621 for detecting a parking space near the destination building, a parked vehicle detection unit 622 for detecting another vehicle which is parked in the parking space detected by the parking space detection unit 621, and a parking-allowable parking space storage unit 623 for storing information on the parking space in which another parked vehicle has not been detected by the parked vehicle detection unit 622, among the parking spaces detected by the parking space detection unit 621. Furthermore, the parking space searching unit 620 includes an empty parking space detection unit 624 for detecting for presence or absence of an obstacle near a parking space in which another parked vehicle has been detected by the parked vehicle detection unit 622 and the user's vehicle cannot be parked, to detect an empty parking space.

The parking space detection unit 621 obtains the user preference information from the user setting storage unit 111, and obtains information on the destination building designated by the user, according to the obtained preference information. The parking space detection unit 621 that has obtained the information on the destination building performs searching and detection of a parking space near the destination building by using a periphery image taken by the camera 161, and, for example the map information representing the periphery of the user's vehicle and the position information of the user's vehicle as obtained by the external information receiving unit 162. The parking space detection unit 521 outputs the information on the detected parking space, to the parked vehicle detection unit 622, the parking-allowable parking space storage unit 623, and the empty parking space detection unit 624.

The parked vehicle detection unit 622 detects a parked vehicle that is parked in the parking space detected by the parking space detection unit 621 in the same manner as performed by the parked vehicle detection unit 122 of embodiment 1.

The empty parking space detection unit 624 detects for presence or absence of an obstacle near the parking space in which another parked vehicle has been detected by the parked vehicle detection unit 622, to detect an empty parking space. The empty parking space is detected by using the periphery image taken by the camera 161, and, for example, the map information representing the periphery of the user's vehicle and the position information of the user's vehicle as obtained by the external information receiving unit 162. A range in which the empty parking space detection unit 624 searches for the empty parking space is set according to the user setting information. In embodiment 6, positions, around the center of the subject parking space, which are distant from the center by 5 m or less are set as one example of a range in which the empty parking space is detected.

The parking-allowable parking space storage unit 623 obtains information on the parking space from the parking space detection unit 621 and stores only a space in which the user's vehicle can be parked, among the detected parking spaces, as the parking-allowable parking space, with reference to the result of detection of the parked vehicle by the parked vehicle detection unit 622. Furthermore, the empty parking space detected by the empty parking space detection unit 624 is also stored as the parking-allowable parking space. Thus, a parking space in which parking is possible and an empty parking space near a parking space in which parking is impossible are stored as the parking-allowable parking spaces in the parking-allowable parking space storage unit 623.

The target parking space selection unit 630 obtains information on the parking-allowable parking space from the parking-allowable parking space storage unit 623, obtains the user preference information from the user setting storage unit 111, sets the condition representing "the distance from the entrance of the destination building is shortest", as the selection condition, according to the obtained preference information, and selects the target parking space according to this selection condition.

The target parking space selection unit 630 includes a distance calculation unit 631 for calculating a distance from the entrance of the destination building. The distance calculation unit 631 obtains the position information of the entrance of the destination building from the destination building detection unit 615, and calculates a distance from the entrance of the destination building to each of one or more parking-allowable parking spaces stored in the parking-allowable parking space storage unit 623. The target parking space selection unit 630 sets a parking-allowable parking space that is distant from the entrance of the destination building by the shortest distance, as the target parking space, according to the selection condition for selecting the target parking space.

Next, an operation will be described. FIG. 18 is a flow chart showing a parking assistance method according to embodiment 6. FIG. 19 is a flow chart showing a parking space searching process according to embodiment 6. The parking assistance method according to embodiment 6 includes the "user setting process" and the "parking assistance process" as in embodiment 1. Furthermore, the parking assistance process includes the "parking space searching process", the "target parking space selection process", the "parking operation assistance start determination process", and the "parking operation assisting process" as in embodiment 1. Firstly, input of the preference information indicating that "I would like to park my vehicle in the parking space closest to the entrance of (destination building) or a space close thereto" and another condition for the parking is received from the user (step ST101), and is stored as the user setting information in the user setting storage unit 111 (step ST102), and the user setting process ends.

The parking assistance process is performed when the user is driving the user's vehicle after the user setting process has ended. Firstly, it is determined whether or not the vehicle has entered the parking lot or is near the parking lot and is running at a low speed (step ST111). In a case where the user's vehicle is not running at a low speed in the parking lot or near the parking lot, the operation canceling unit 190 performs the operation canceling process (step ST120).

In a case where the user's vehicle is running at a low speed in the parking lot or near the parking lot, the display device 181 is caused to display the display screen 900A, and the destination building detection unit 615 and the parking space searching unit 620 perform the parking space searching process (step ST612). In the parking space searching process, firstly, the destination building detection unit 615 detects the entrance of the destination building, to obtain the position information thereof (step ST6120). Next, the parking space detection unit 621 searches for a parking space near the destination building (step ST6121). A searching range is determined based on the user setting information. For example, positions, around the center of the user's vehicle, which are distant from the center by 5 m or less are set as the searching range. After the searching has ended, whether or not a parking space has been detected is determined (step ST6122). In a case where the parking spaces have not been detected at all, the process ends.

In a case where the parking space has been detected, the parked vehicle detection unit 622 determines whether or not another vehicle is parked in the detected parking space (step ST6123). In a case where another vehicle is not parked, the information on the detected parking space is stored as the parking-allowable parking space in the parking-allowable parking space storage unit 623 (step ST6124), and the process ends.

In a case where it is determined in step ST6123 that another vehicle is parked, the empty parking space detection unit 624 searches for an empty parking space while detecting for presence or absence of an obstacle near the parking space in which the other vehicle is parked (step ST6125). After the searching, whether or not an empty parking space has been detected is determined (step ST6126). In a case where the empty parking space has not been detected, the process ends. In a case where the empty parking space has been detected, the information on the detected empty parking space is stored as the parking-allowable parking space in the parking-allowable parking space storage unit 623 (step ST6127), and the process ends.

In a case where a plurality of parking spaces have been detected in step ST6121, step ST6123 to step ST6127 are performed for each parking space. In a case where a plurality of empty parking spaces are detected in step ST6126, all of the detected empty parking spaces are stored as the parking-allowable parking spaces in step ST6127. Thus, when the searching has ended, information on all the parking-allowable parking spaces has been stored in the parking-allowable parking space storage unit 623.

After the parking space searching process has ended, the target parking space selection unit 630 determines whether or not information on one or more parking-allowable parking spaces has been stored in the parking-allowable parking space storage unit 623 (step ST113). In a case where the parking-allowable parking spaces have not been stored at all, the process proceeds to step ST120, and the operation canceling process is performed.

In a case where one or more parking-allowable parking spaces are stored, the target parking space selection process is performed. Firstly, the distance calculation unit 631 calculates a distance between the position of the entrance of the destination building and the position of each parking-allowable parking space (step ST614), and a parking-allowable parking space which is distant from the entrance of the destination building by the shortest distance is selected as the target parking space (step ST615). When the target parking space has been selected, the display unit 180 updates the display screen to be displayed on the display device 181 (step ST116).

Step ST117 and the subsequent steps are the same as in embodiment 1, and the description thereof is omitted.

According to embodiment 6, the same effect as in embodiment 1 can be obtained.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

10, 20, 30, 40, 50, 60 parking assistance apparatus
110 user setting unit
111 user setting storage unit
120, 520, 620 parking space searching unit
121, 521, 621 parking space detection unit
122, 522, 622 parked vehicle detection unit
123, 523, 623 parking-allowable parking space storage unit
130, 230, 330, 430, 530, 630 target parking space selection unit
131 time-required-for-parking calculation unit
231, 531, 631 distance calculation unit
331 time-required-for-exiting-parking-lot calculation unit
431 parking margin space calculation unit
140 parking operation assistance start determination unit
150 parking operation assisting unit
161 camera
162 external information receiving unit
180 display unit
181 display device
190 operation canceling unit
315 exit detection unit
524, 624 empty parking space detection unit
615 destination building detection unit
821 input device
822 GPS unit
900A, 900B, 900C display screen
901 user's vehicle
902 another vehicle
903 obstacle
911 to 914 parking-allowable parking space
920 predicted parking route

The invention claimed is:

1. A parking assistance apparatus comprising:
a processor for executing a program; and
a memory or a hard disk for storing the program, wherein the following operation is performed by the program executed by the processor,
allowing a user to set information on parking of a user's vehicle;
searching for a space in which the user's vehicle can be parked, and selecting a target parking space in which the user's vehicle is to be parked, based on the information on parking of the user's vehicle set by the user;
assisting in a parking operation for parking the user's vehicle in the selected target parking space, based on a start determination result,
wherein
in a case where the start determination result indicates that assistance in the parking operation can be started by the parking operation assisting apparatus, and
wherein the processor cancels a parking assistance operation being executed, and starts the parking assistance operation from a beginning when a predetermined condition is satisfied.

2. The parking assistance apparatus according to claim 1, wherein the start determination result determines whether or not the parking operation assisting apparatus can start assisting in a parking operation, based on a running state of the user's vehicle or a shift state of the user's vehicle.

3. The parking assistance apparatus according to claim 1, wherein
In the process of searching for the space, the processor detects a parking space based on the information on parking of the user's vehicle set by the user,
detects another vehicle parked in a parking space detected in the process of searching for the space, and
the memory or the hard disk stores a parking space in which another parked vehicle has not been detected, among parking spaces detected in the process of searching for the space, as a parking space in which parking is possible.

4. The parking assistance apparatus according to claim 3, wherein in the process of searching for the space, the processor determines whether or not the detected parking space is a challenged person preferential parking space, by using image information or position information of the detected parking space.

5. The parking assistance apparatus according to claim 3, wherein in the process of searching for the space, the processor detects for presence or absence of an obstacle to detect an empty parking space, in a preset range around a parking space detected in the process of searching for the parking space.

6. The parking assistance apparatus according to claim 1, wherein in the process of selecting the target parking space, the processor calculates a time required for completing parking of the user's vehicle, for each of a plurality of parking spaces in which parking is possible, and selects a parking space for which the time required for parking is shortest and in which parking is possible, as the target parking space.

7. The parking assistance apparatus according to claim 1, wherein in the process of selecting the target parking space, the processor calculates a time required for completing exit of the user's vehicle from a parking lot, for each of a plurality of parking spaces in which parking is possible, and selects a parking space which allows a time required for exiting the parking lot to be shortest and in which parking is possible, as the target parking space.

8. The parking assistance apparatus according to claim 1, wherein in the process of selecting the target parking space, the processor calculates a parking margin space that is a space on both sides of the user's vehicle when parking has been completed, for each of a plurality of parking spaces in which parking is possible, and selects a parking space in which the parking margin space is largest and parking is possible, as the target parking space.

9. The parking assistance apparatus according to claim 1, wherein in the process of selecting the target parking space, the processor calculates a distance from the user's vehicle to each of a plurality of parking spaces in which parking is possible, and selects a parking space which is distant from the user's vehicle by the shortest distance and in which parking is possible, as the target parking space.

10. The parking assistance apparatus according to claim 1, wherein in the process of selecting the target parking space, the processor calculates a distance from a position of an entrance, of a destination building, designated by a user to each of a plurality of parking spaces in which parking is possible, and selects a parking space which is distant by the shortest distance from the position of the entrance, of the destination building, designated by the user and in which parking is possible, as the target parking space.

11. The parking assistance apparatus according to claim 1, comprising a display apparatus for displaying the target parking space.

12. The parking assistance apparatus according to claim 1, the memory or the hard disk stores information on parking of the user's vehicle set by the user.

13. The parking assistance apparatus according to claim 1, wherein in a case where the target parking space is already selected when the parking assistance operation is canceled by the processor, the processor cancels the selection of the target parking space and the target parking space is selected again.

14. A parking assistance method comprising:
a user setting step of allowing a user to set information on parking of a user's vehicle;
a target parking space searching•selecting step of searching for a space in which the user's vehicle can be parked, and selecting a target parking space in which the user's vehicle is to be parked, based on the information having been set by the user;
a parking operation assisting step of assisting in a parking operation for parking the user's vehicle in the selected target parking space, based on a start determination result in a parking operation assistance start determination step described below;
a parking operation assistance start determination step of starting assisting in a parking operation in the parking operation assisting step in a case where the start determination result indicates that assistance in the parking operation in the parking operation assisting step can be started; and
an operation canceling step of canceling a parking assistance operation being executed, and starting the parking assistance operation from a beginning when a predetermined condition is satisfied.

15. The parking assistance method according to claim 14, wherein the target parking space searching selecting step includes a parking space detection step of detecting a parking space based on the information having been set by the user,
a parked vehicle detection step of detecting another vehicle parked in a parking space detected in the parking space detection step, and
a step of storing a parking space in which another parked vehicle has not been detected in the parked vehicle detection step, among parking spaces detected in the parking space detection step, as a parking space in which parking is possible.

16. The parking assistance method according to claim 15, wherein, in the parking space detection step, whether or not the detected parking space is a challenged person preferential parking space is determined by using image information or position information of the detected parking space.

17. The parking assistance method according to claim 15, wherein the target parking space searching•selecting step includes a step of detecting for presence or absence of an obstacle to detect an empty parking space, in a preset range around a parking space detected in the parking space detection step.

18. The parking assistance method according to claim 14, wherein, in the target parking space searching•selecting step, a parking space for which a time required for completing parking of the user's vehicle is shortest and in which parking is possible, is selected as the target parking space.

19. The parking assistance method according to claim 14, wherein, in the target parking space searching•selecting step, a parking space which allows a time required for completing exit of the user's vehicle from a parking lot to be shortest and in which parking is possible, is selected as the target parking space.

20. The parking assistance method according to claim 14, wherein, in the target parking space searching•selecting step, a parking space in which a parking margin space that is a space on both sides of the user's vehicle is largest when parking has been completed and parking is possible, is selected as the target parking space.

21. The parking assistance method according to claim 14, wherein, in the target parking space searching selecting step, a parking space which is distant from the user's vehicle by the shortest distance and in which parking is possible, is selected as the target parking space.

22. The parking assistance method according to claim 14, wherein, in the target parking space searching•selecting step, a parking space which is distant by the shortest distance from an entrance, of a destination building, designated by a user and in which parking is possible, is selected as the target parking space.

23. The parking assistance method according to claim 14, further comprising a step of displaying the target parking space.

24. The parking assistance method according to claim 14, further comprising a step of storing information having been set by the user.

25. The parking assistance method according to claim 14, wherein in a case where the target parking space is already selected when the parking assistance operation is canceled in the operation canceling step, the selection of the target parking space is canceled and the target parking space is selected again.

* * * * *